US011600199B1

(12) United States Patent
Perez et al.

(10) Patent No.: US 11,600,199 B1
(45) Date of Patent: Mar. 7, 2023

(54) INCIDENT EVALUATION, TRAINING, AND CORRECTION PROCESSES AND SYSTEM WITH A CLOUD-BASED TRAINING TOOL FOR COACHING AND REINFORCEMENT OF DEFENSIVE DRIVER SKILLS AND KNOWLEDGE

(71) Applicants: Michael Arthur Perez, Walnut, CA (US); Andrew C Ray, Concord, CA (US); Patrick Washington, View Park, CA (US)

(72) Inventors: Michael Arthur Perez, Walnut, CA (US); Andrew C Ray, Concord, CA (US); Patrick Washington, View Park, CA (US)

(73) Assignee: Certified Safe Driver, Inc., Walnut, CA (US)

( * ) Notice: Subject to any disclaimer, the term of this patent is extended or adjusted under 35 U.S.C. 154(b) by 91 days.

(21) Appl. No.: 17/098,060

(22) Filed: Nov. 13, 2020

Related U.S. Application Data

(60) Provisional application No. 62/935,009, filed on Nov. 13, 2019.

(51) Int. Cl.
*G09B 19/16* (2006.01)
*G06V 20/59* (2022.01)
*G06V 40/20* (2022.01)
*G06Q 50/26* (2012.01)
*G06Q 50/20* (2012.01)
*G06Q 30/018* (2023.01)
*G06Q 10/10* (2023.01)

(52) U.S. Cl.
CPC ......... *G09B 19/167* (2013.01); *G06V 20/597* (2022.01); *G06V 40/20* (2022.01); *G06Q 10/10* (2013.01); *G06Q 30/018* (2013.01); *G06Q 50/2057* (2013.01); *G06Q 50/265* (2013.01)

(58) Field of Classification Search
CPC .... G09B 19/167; G09B 19/16; G06V 20/597; G06V 40/20; G06Q 10/10; G06Q 30/018; G06Q 50/2057; G06Q 50/265
See application file for complete search history.

(56) References Cited

U.S. PATENT DOCUMENTS

2012/0135382 A1* 5/2012 Winston ............... G09B 19/167 434/65
2015/0116493 A1* 4/2015 Bala ..................... G06V 40/171 348/148

* cited by examiner

*Primary Examiner* — Timothy A Musselman
(74) *Attorney, Agent, or Firm* — Plager Schack LLP; Mark H. Plager; Stephen Hallberg

(57) ABSTRACT

A cloud-based training tool for coaching and reinforcement of defensive driver skills and knowledge is disclosed. The cloud-based training tool for coaching and reinforcement of defensive driver skills and knowledge is unlike anything in its field. The cloud-based training tool for coaching and reinforcement of defensive driver skills and knowledge uses a scoring system that provides accuracy on knowledge and skills.

8 Claims, 26 Drawing Sheets

INCIDENT EVALUATION, TRAINING, AND CORRECTION PROCESSES AND SYSTEM WITH A CLOUD-BASED TRAINING TOOL FOR COACHING AND REINFORCEMENT OF DEFENSIVE DRIVER SKILLS AND KNOWLEDGE

CLAIM OF BENEFIT TO PRIOR APPLICATION

This application claims benefit to U.S. Provisional Patent Application 62/935,009, entitled "CLOUD-BASED TRAINING TOOL FOR COACHING AND REINFORCEMENT OF DEFENSIVE DRIVER SKILLS AND KNOWLEDGE," filed Nov. 13, 2019. The U.S. Provisional Patent Application 62/935,009 is incorporated herein by reference.

BACKGROUND

Embodiments of the invention described in this specification relate generally to input-based training and knowledge systems, and more particularly, to incident evaluation, training, and correction processes and an incident evaluation, training, and correction system with a cloud-based training tool for coaching and reinforcement of defensive driver skills and knowledge.

Manual input of data is typically needed before creating and compiling data analysis reports. However, this manual process is time consuming and prone to error. Many systems use check marks for binary input (e.g., YES or NO, marked manually in form).

Therefore, what is needed is a way to reduce the process of manual input from creating and compiling data analysis reports and provide an effective evaluation, training, and correct behavior reinforcing mechanism to drivers and other workers or agents in various environments.

BRIEF DESCRIPTION

A novel incident evaluation, training, and correction process and a novel incident evaluation, training, and correction system are disclosed to spot at-risk behavior, explain both the at-risk behavior and correct behavior, enforce the correct behavior, and document the incident that gave rise to the at-risk behavior. In some embodiments, the incident evaluation, training, and correction system includes a cloud-based training tool for coaching and reinforcement of defensive driver skills and knowledge. In some embodiments, the cloud-based training tool uses a scoring system that provides accuracy on knowledge and skills.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Figure 1:
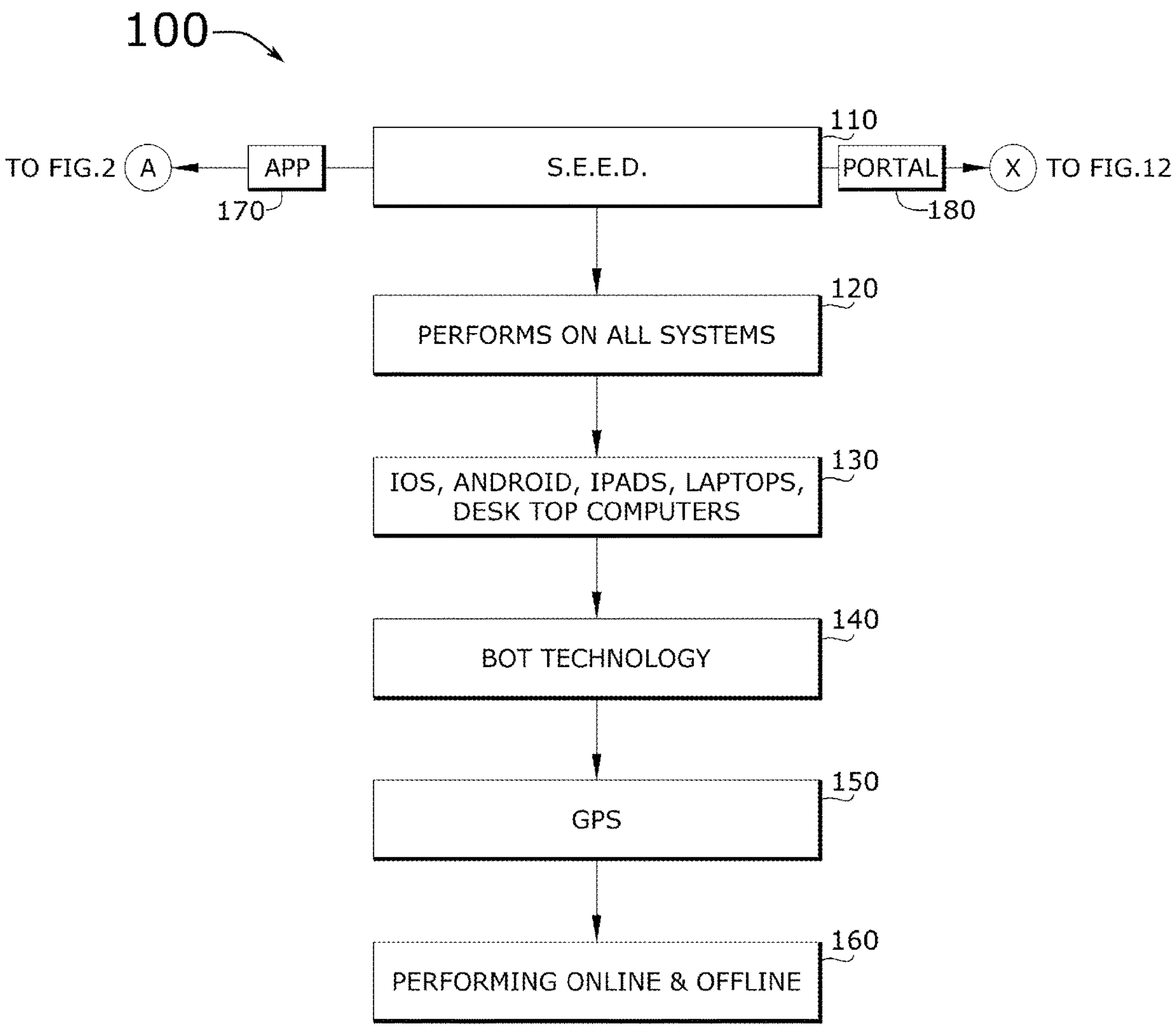

Having thus described the invention in general terms, reference is now made to the accompanying drawings, which are not necessarily drawn to scale, and which show different views of different example embodiments, and wherein:

FIG. 1 conceptually illustrates a cloud-based training tool of a SEED system that performs a SEED process in some embodiments.

Figure 2:
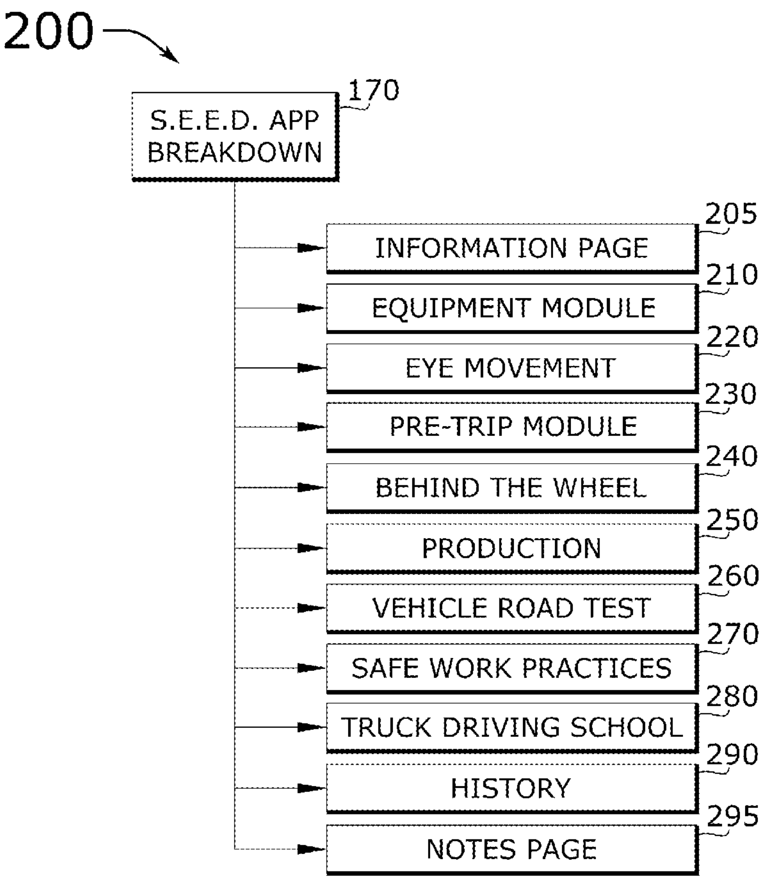

FIG. 2 conceptually illustrates a high level breakdown of a SEED app implementation of an incident evaluation, training, and correction process for spotting at-risk behavior, explaining the both at-risk behavior and correct behavior, enforcing the correct behavior, and documenting the incident that gave rise to the at-risk behavior in some embodiments.

Figure 3:
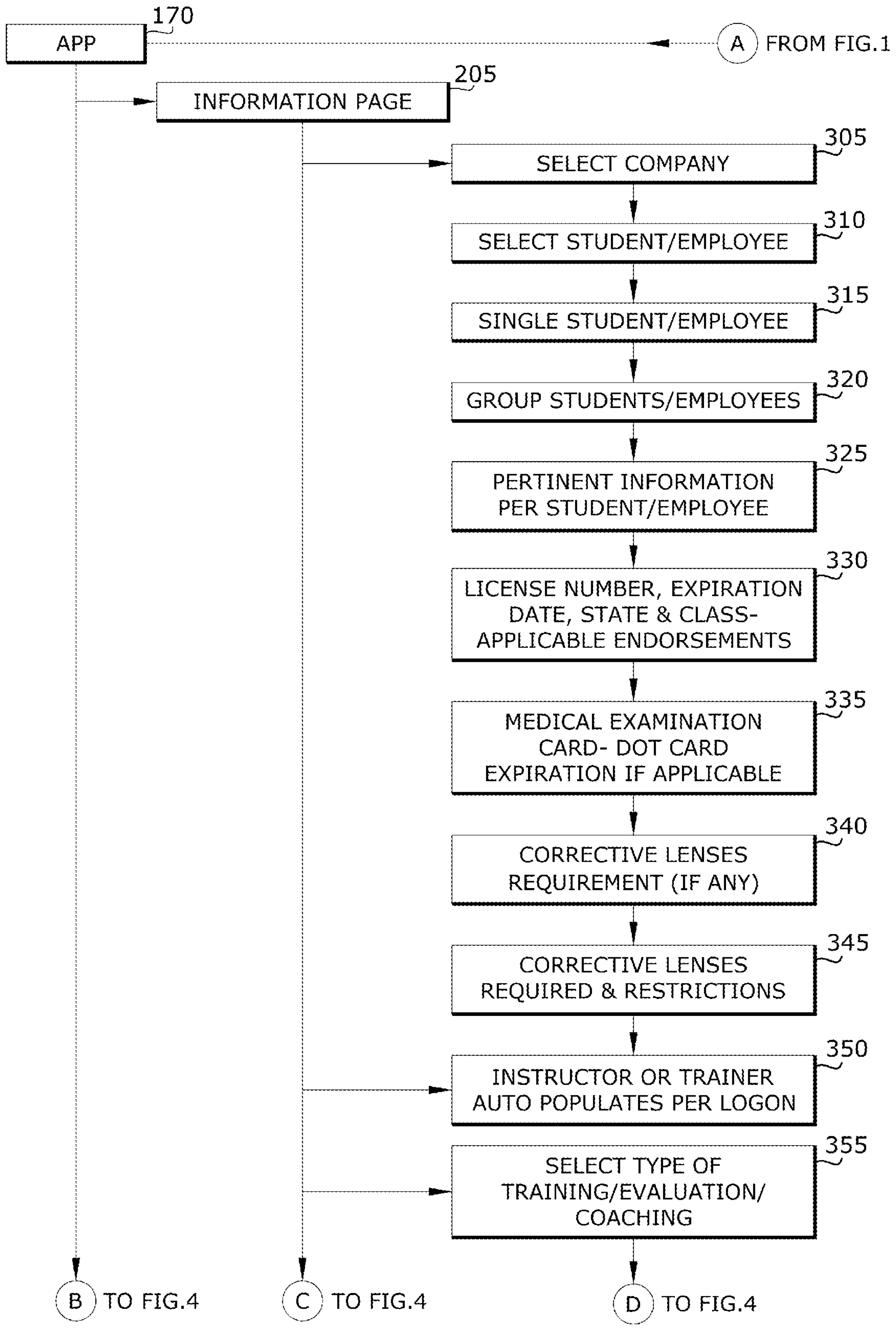

FIG. 3 conceptually illustrates a detailed breakdown of a SEED app implementation of an incident evaluation, training, and correction process for spotting at-risk behavior, explaining the both at-risk behavior and correct behavior, enforcing the correct behavior, and documenting the incident that gave rise to the at-risk behavior in some embodiments.

Figure 4:
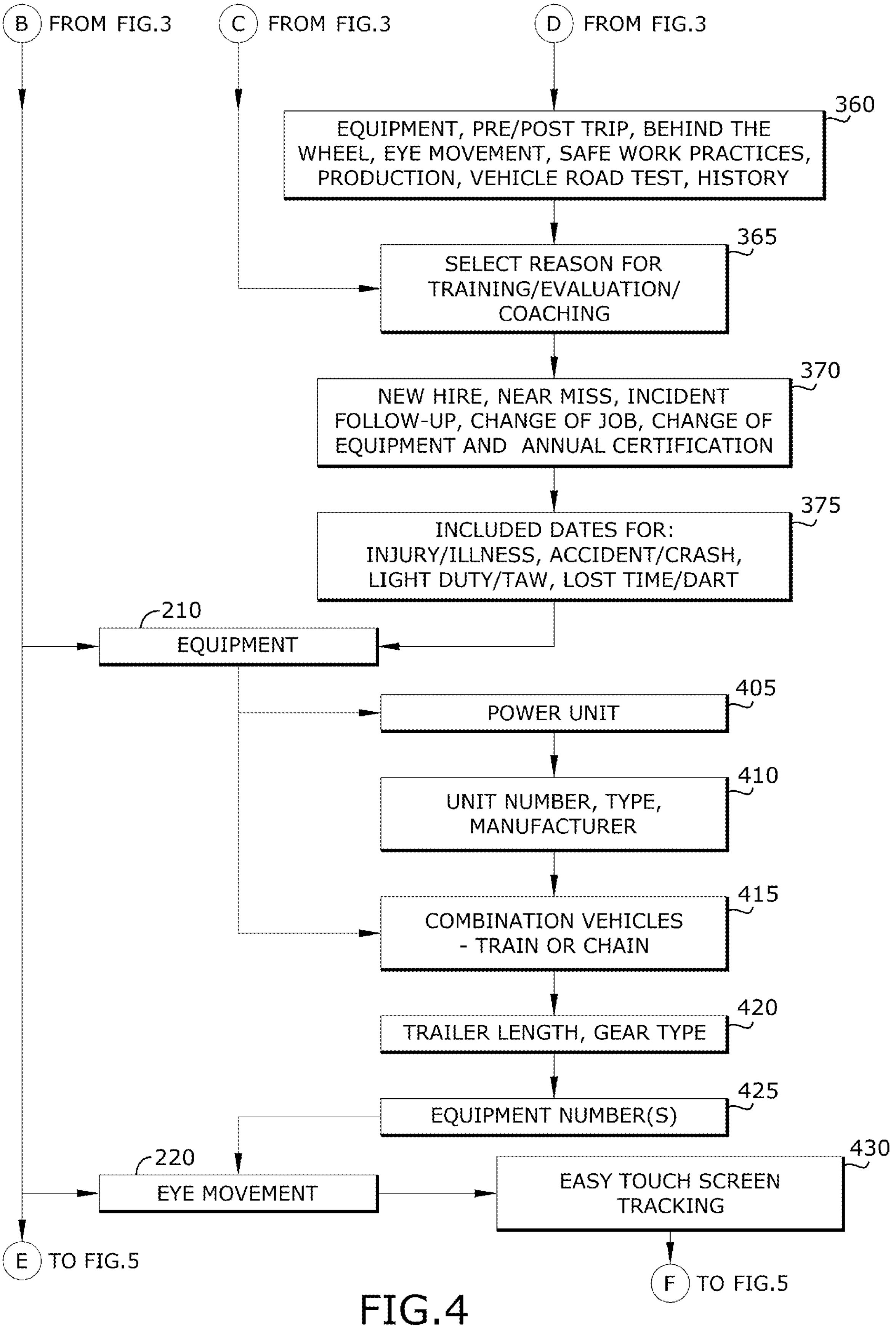

FIG. 4 conceptually illustrates a continuation of the detailed breakdown of the SEED app implementation of the incident evaluation, training, and correction process of FIG. 3.

Figure 5:
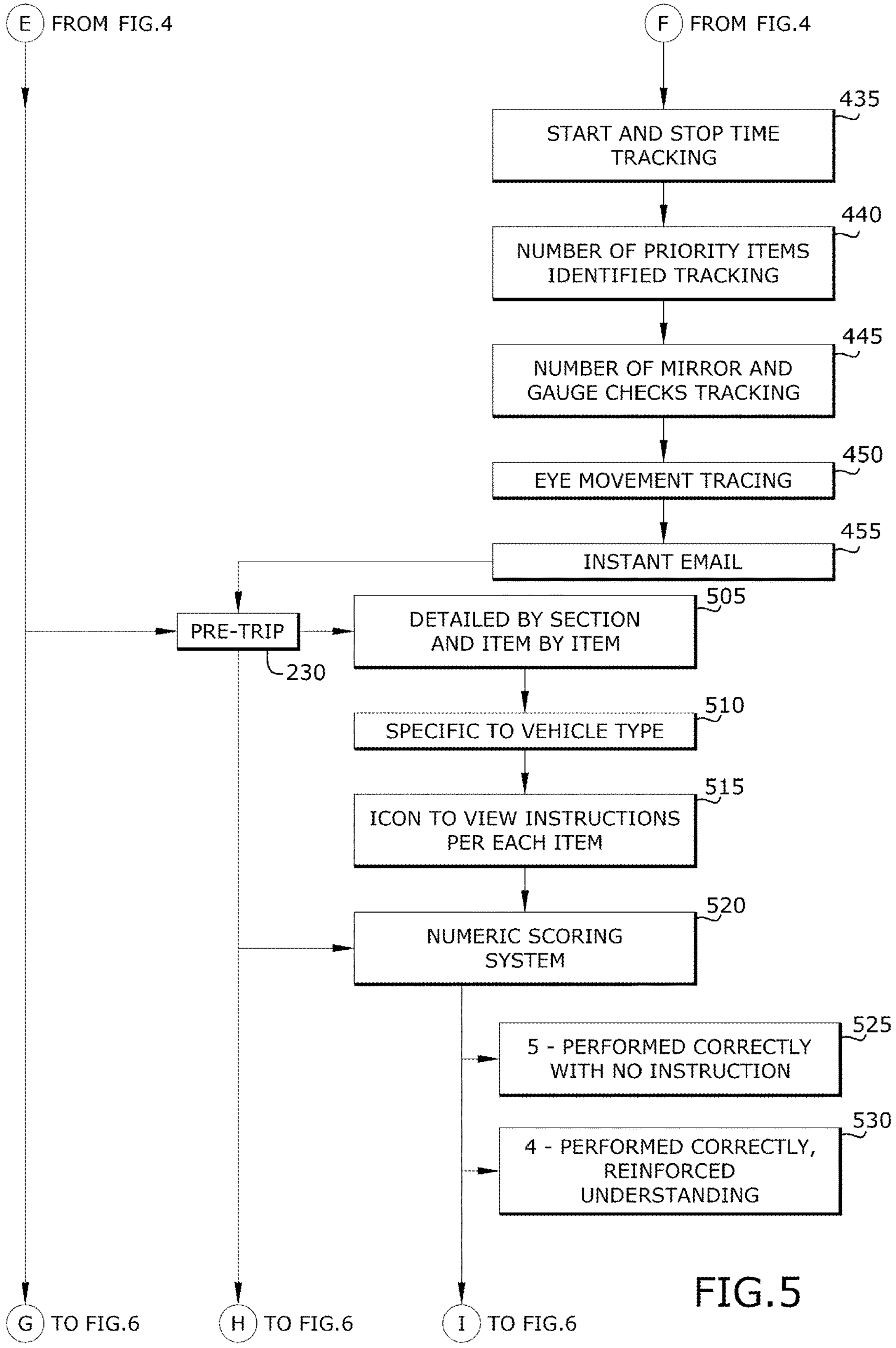

FIG. 5 conceptually illustrates a continuation of the detailed breakdown of the SEED app implementation of the incident evaluation, training, and correction process of FIG. 4.

Figure 6:
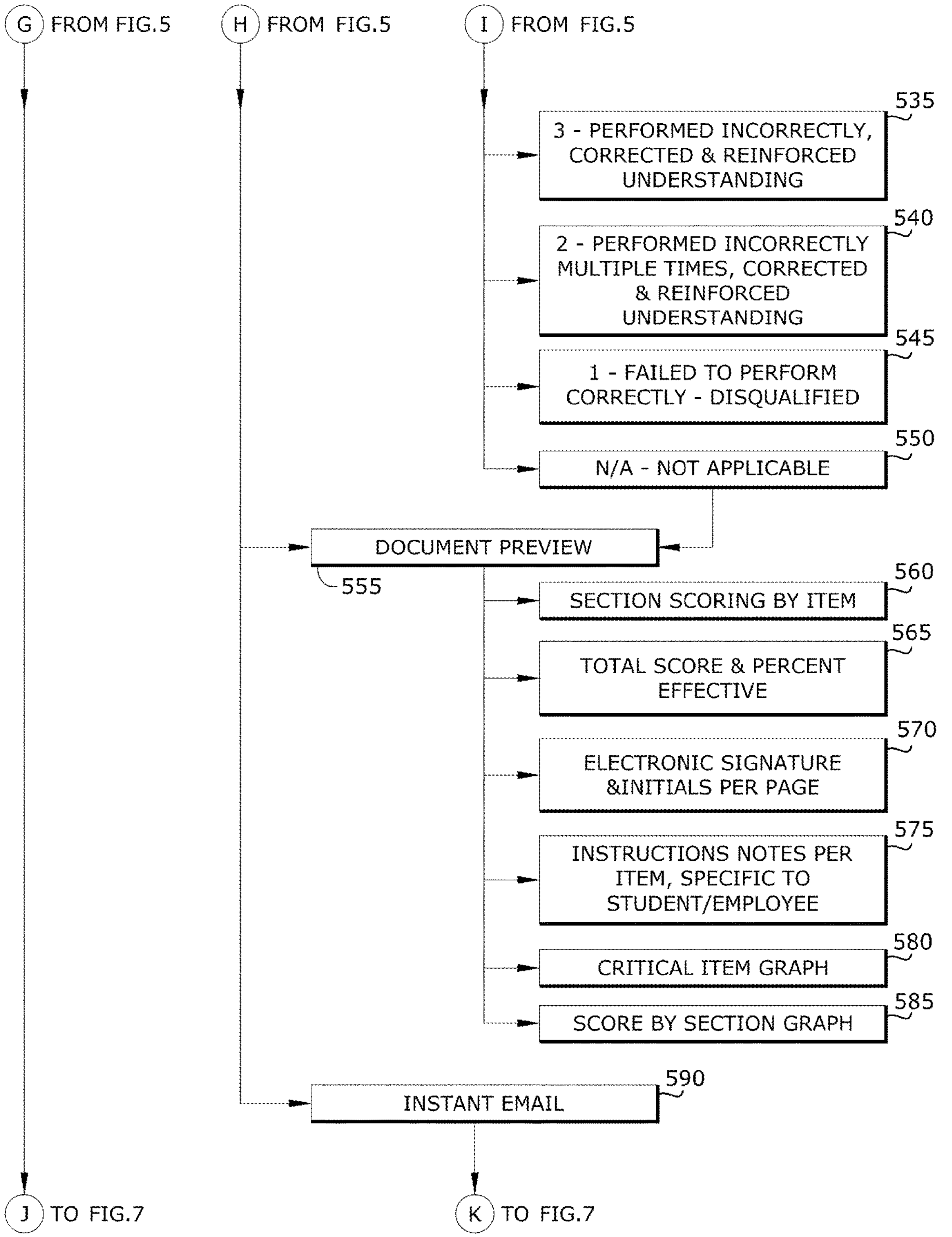

FIG. 6 conceptually illustrates a continuation of the detailed breakdown of the SEED app implementation of the incident evaluation, training, and correction process of FIG. 5.

Figure 7:
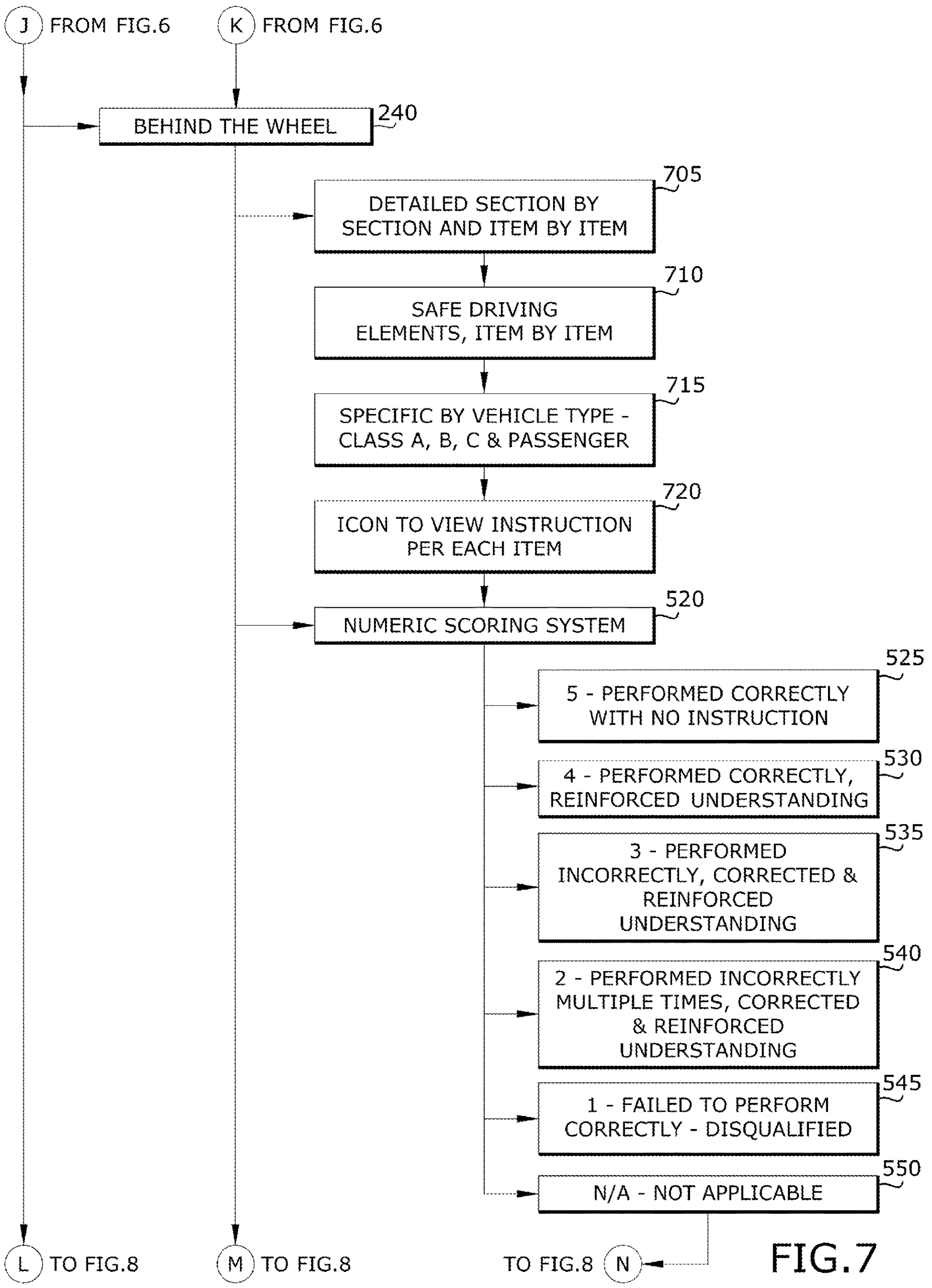

FIG. 7 conceptually illustrates a continuation of the detailed breakdown of the SEED app implementation of the incident evaluation, training, and correction process of FIG. 6.

Figure 8:
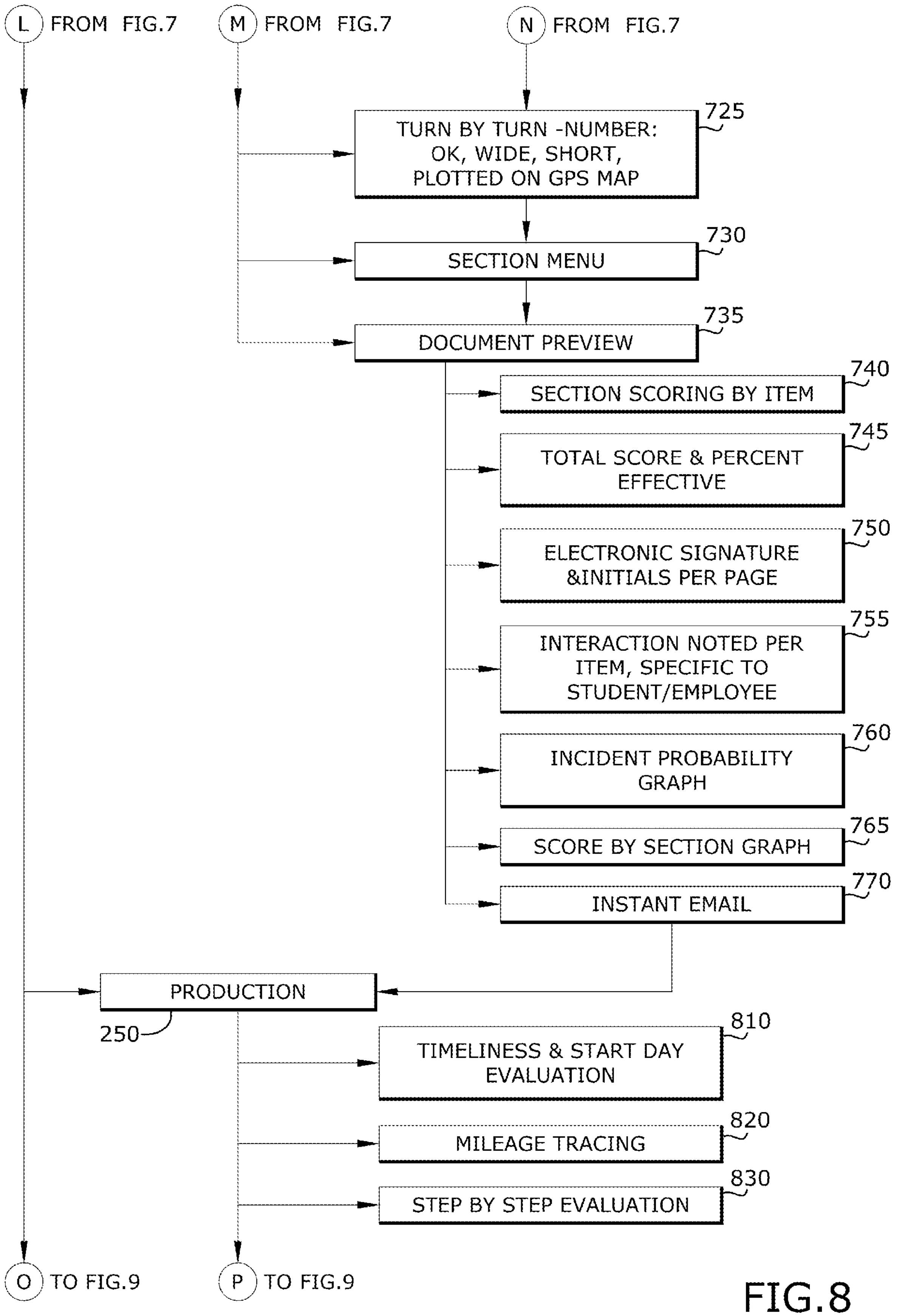

FIG. 8 conceptually illustrates a continuation of the detailed breakdown of the SEED app implementation of the incident evaluation, training, and correction process of FIG. 7.

Figure 9:
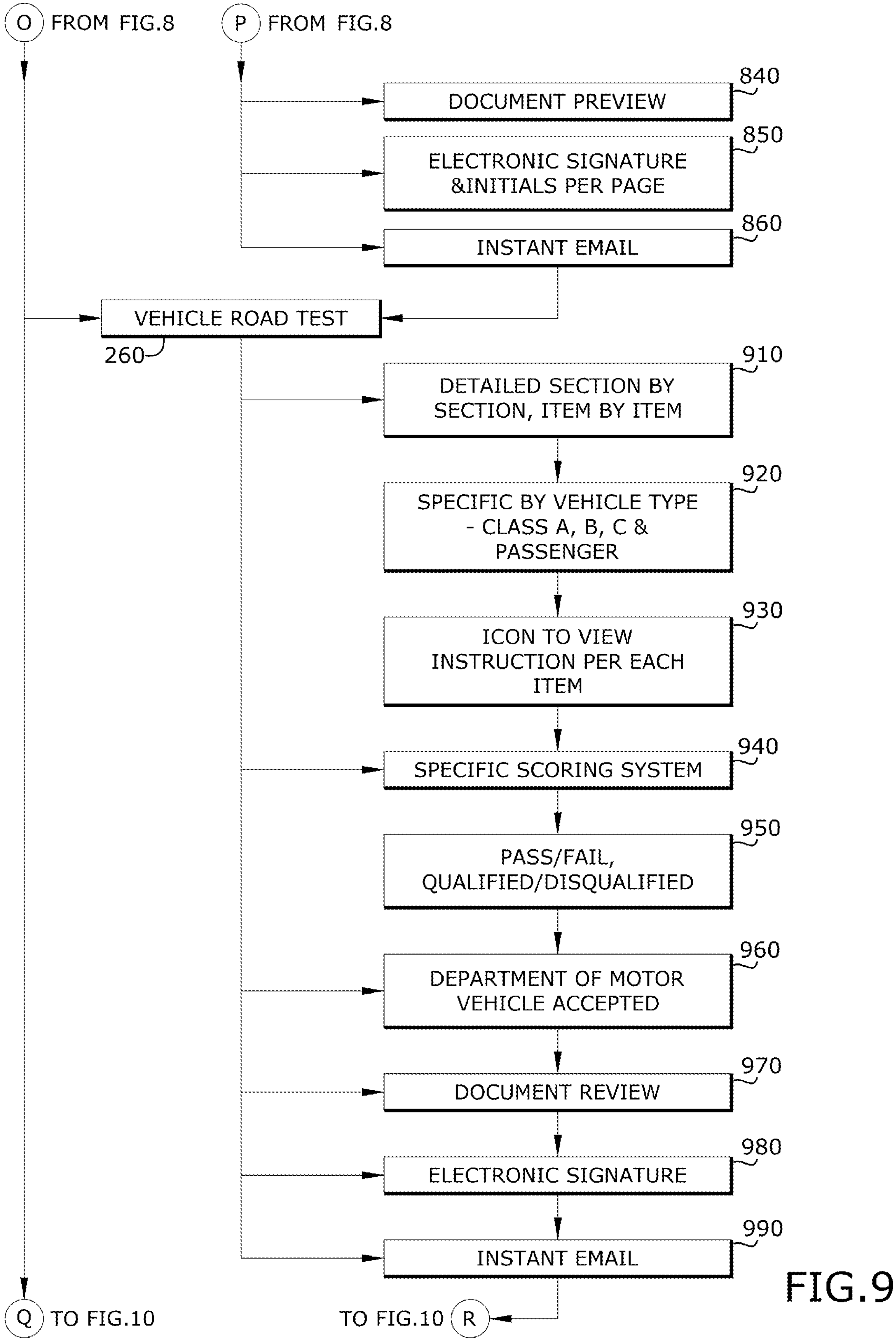

FIG. 9 conceptually illustrates a continuation of the detailed breakdown of the SEED app implementation of the incident evaluation, training, and correction process of FIG. 8.

Figure 10:
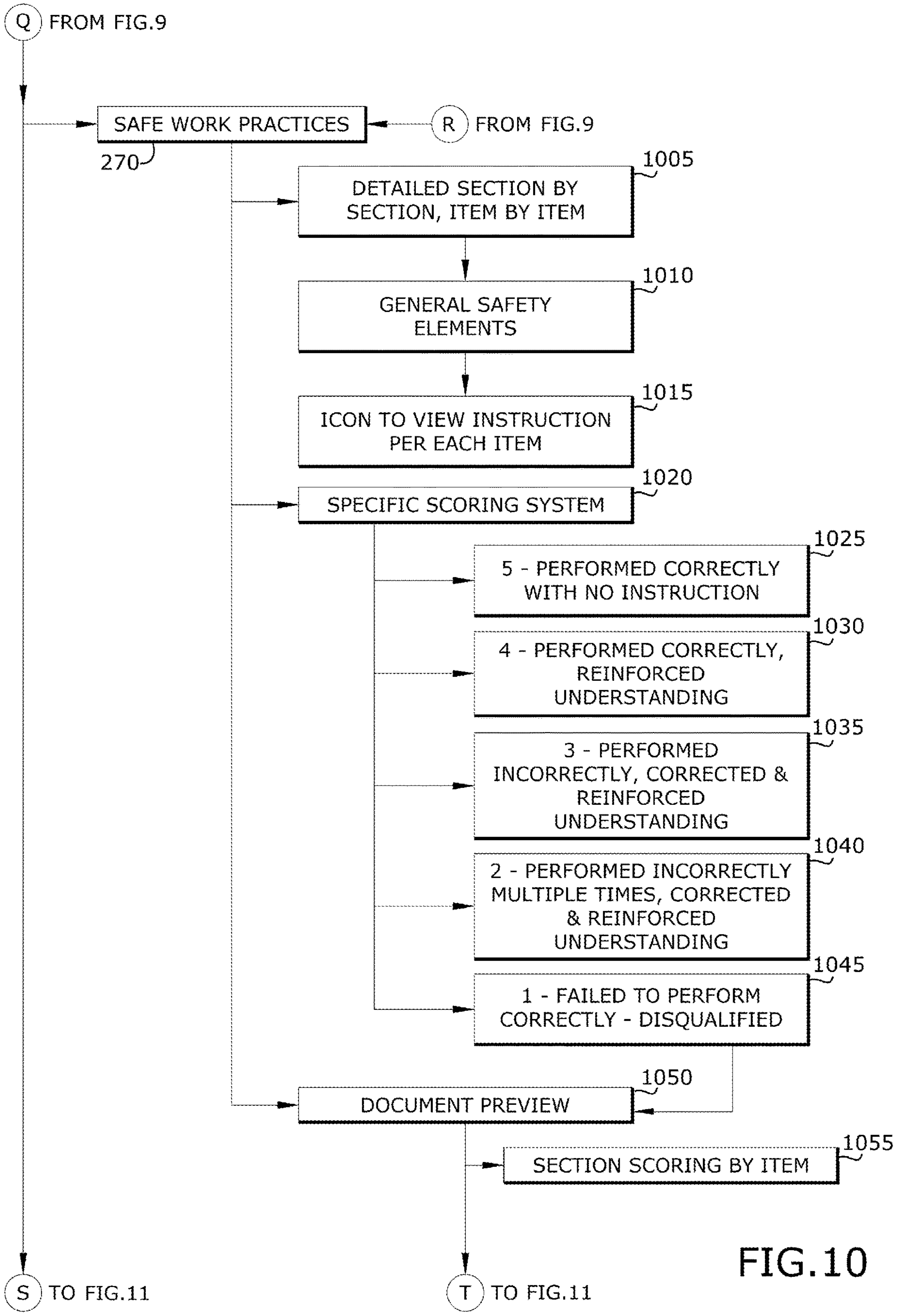

FIG. 10 conceptually illustrates a continuation of the detailed breakdown of the SEED app implementation of the incident evaluation, training, and correction process of FIG. 9.

Figure 11:
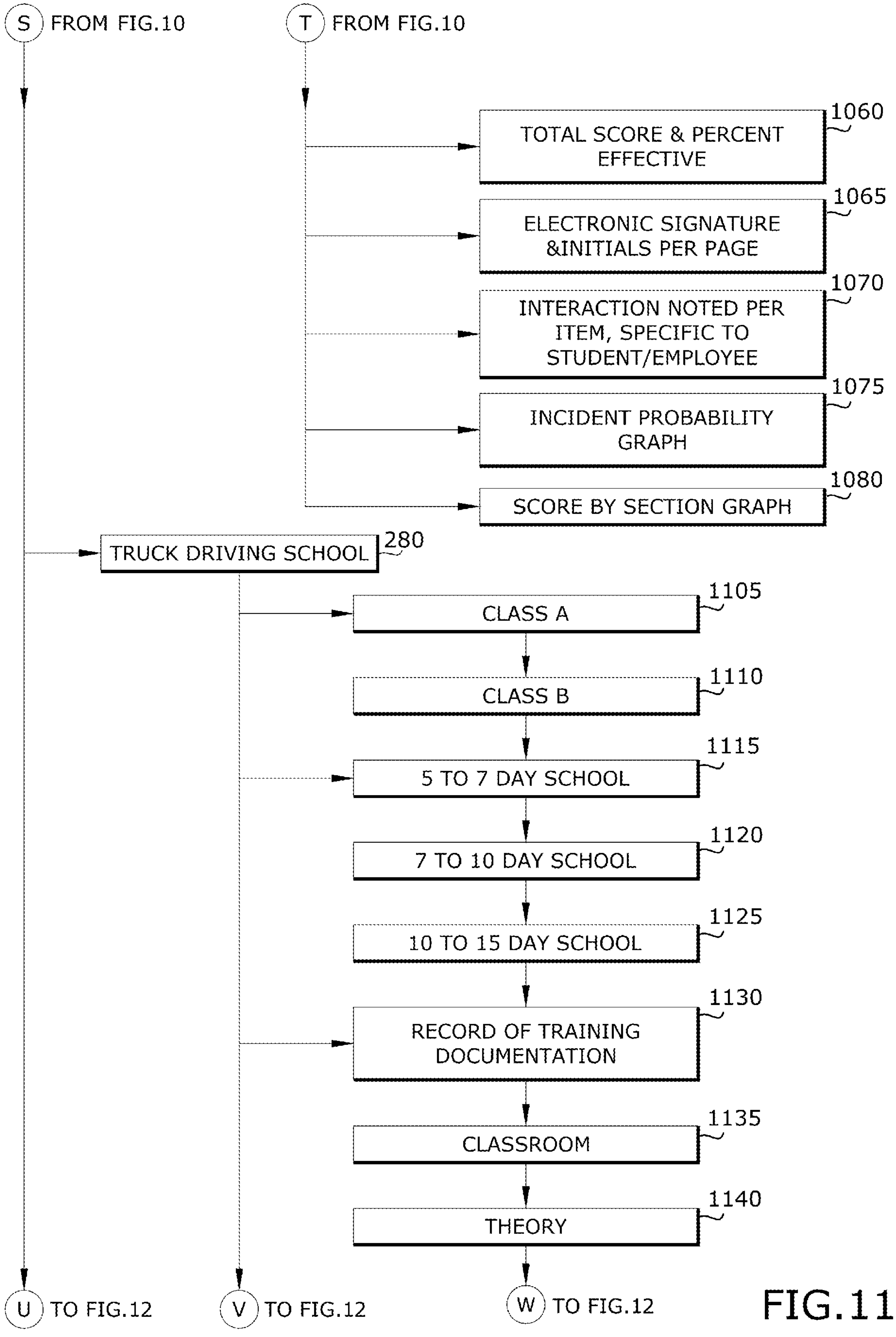

FIG. 11 conceptually illustrates a continuation of the detailed breakdown of the SEED app implementation of the incident evaluation, training, and correction process of FIG. 10.

Figure 12:
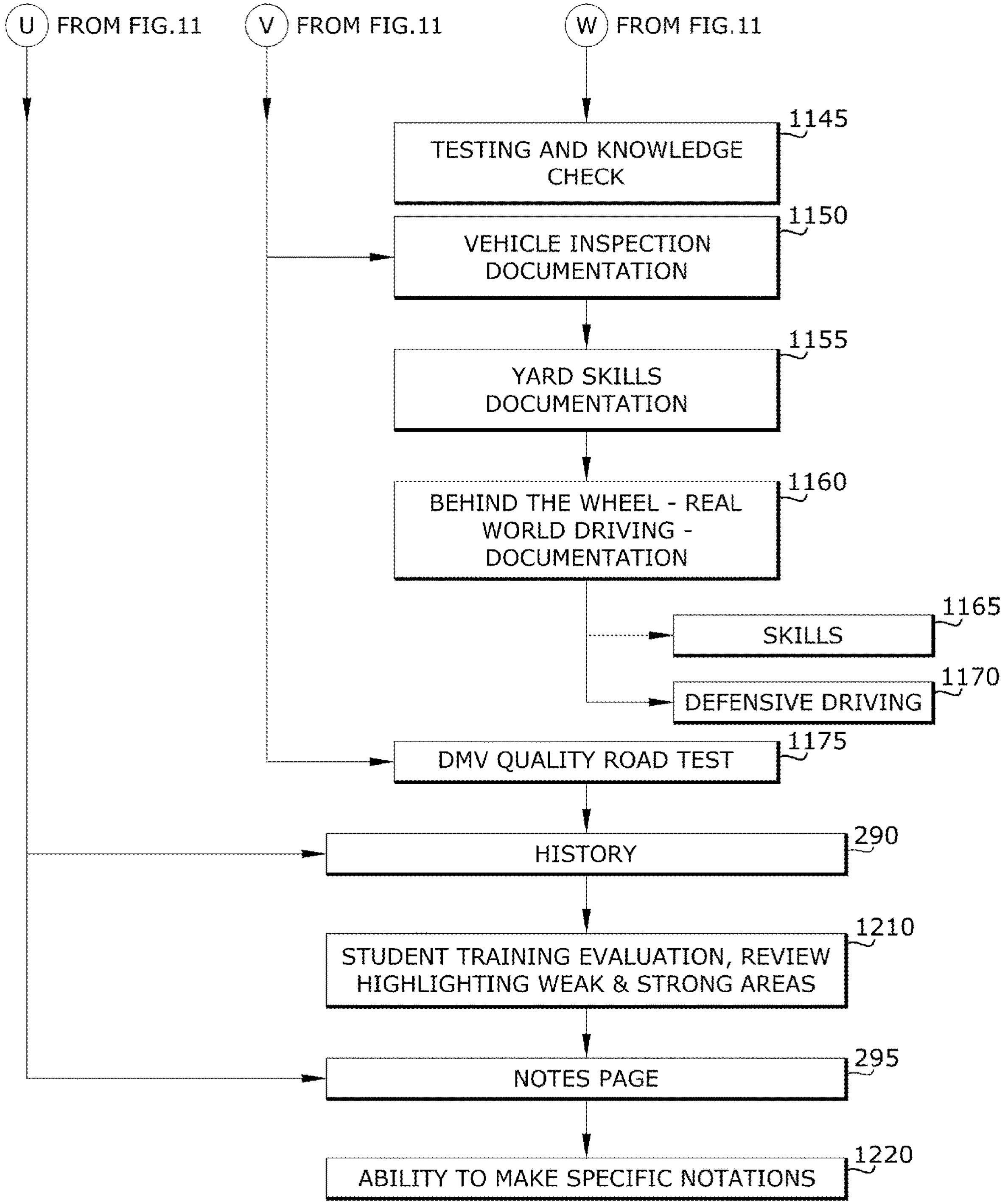

FIG. 12 conceptually illustrates a continuation of the detailed breakdown of the SEED app implementation of the incident evaluation, training, and correction process of FIG. 11.

Figure 13:
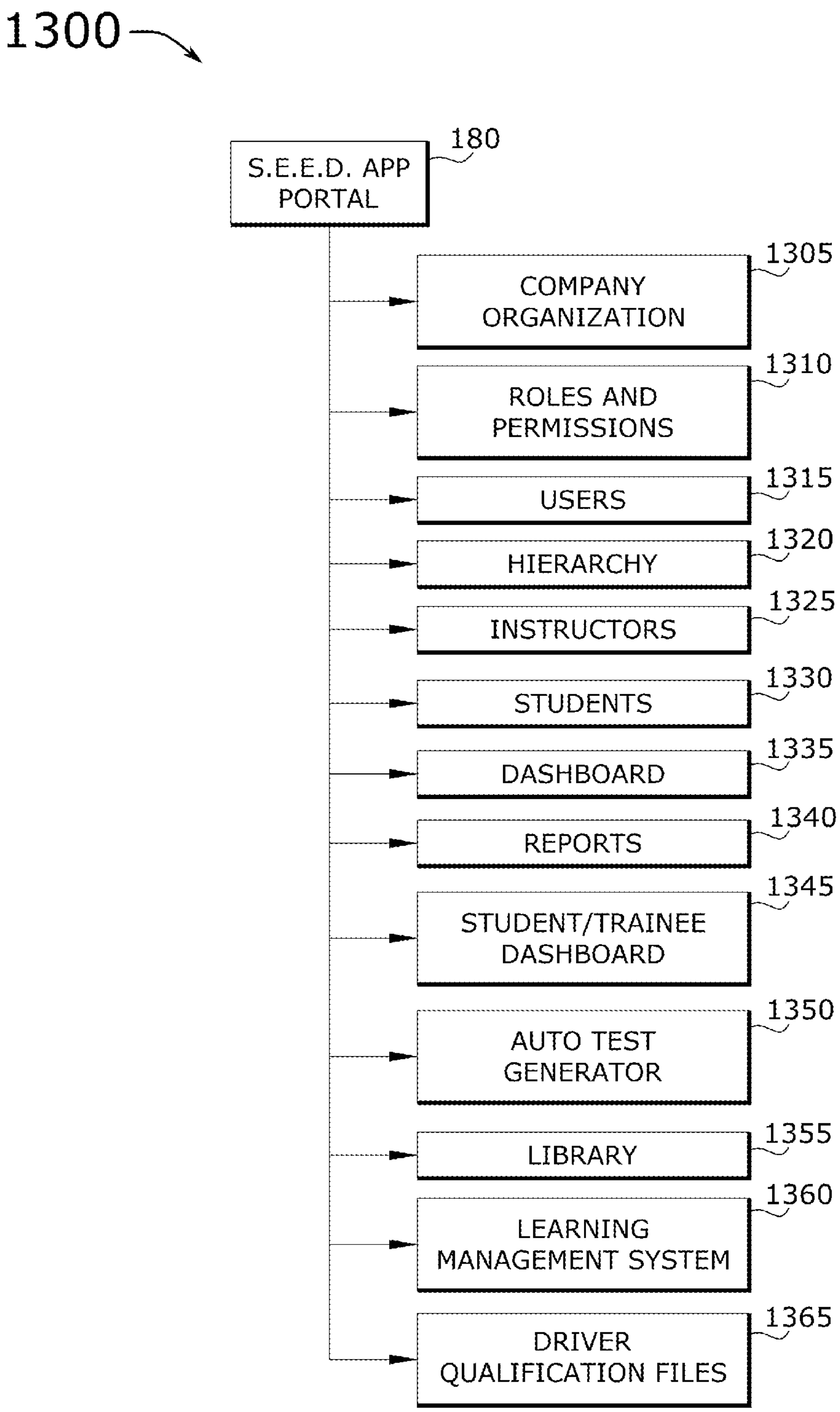

FIG. 13 conceptually illustrates a high level breakdown of a SEED portal implementation of an incident evaluation, training, and correction system to spot at-risk behavior, explain both the at-risk behavior and correct behavior, enforce the correct behavior, and document the incident that gave rise to the at-risk behavior in some embodiments.

Figure 14:
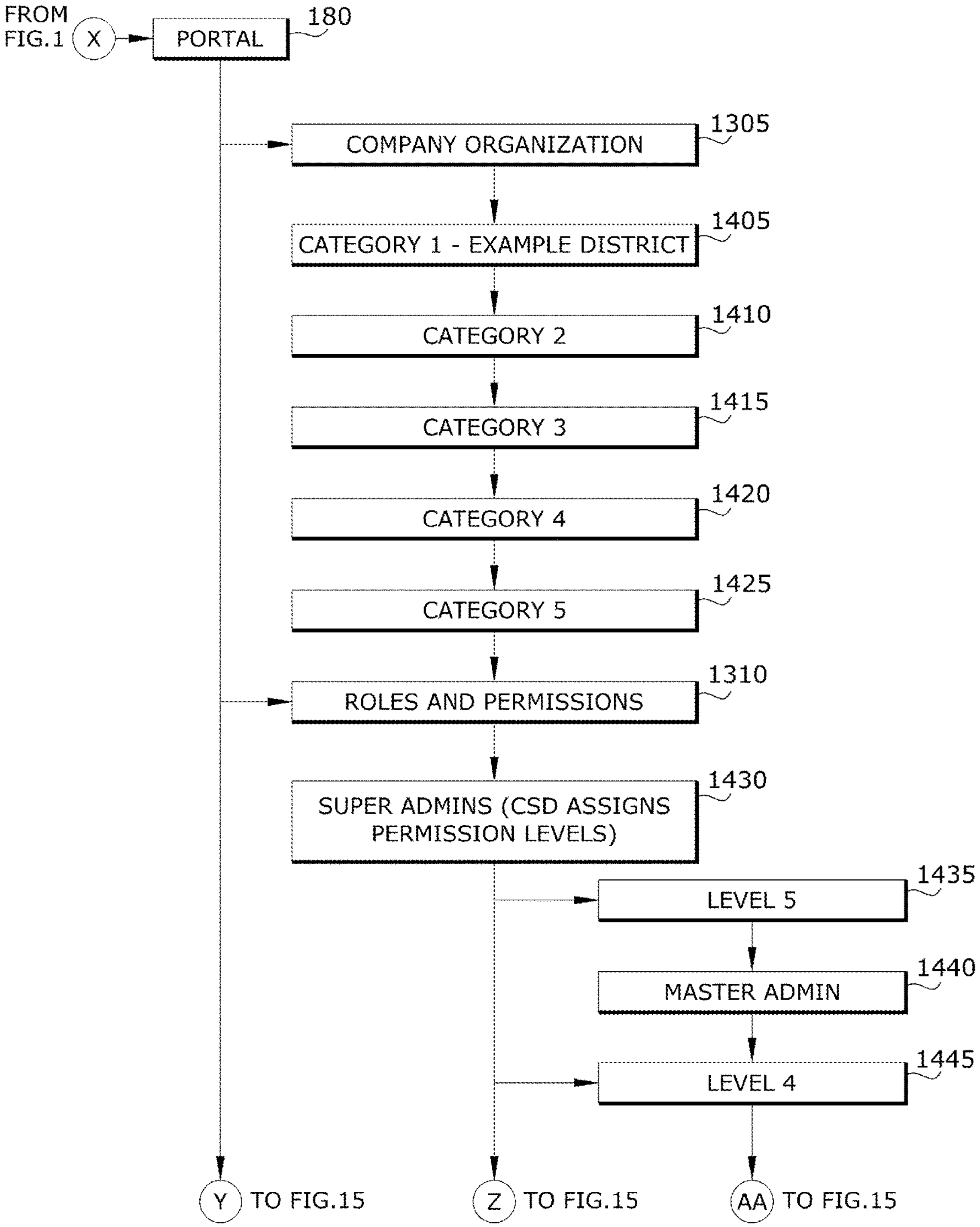

FIG. 14 conceptually illustrates a detailed breakdown of a SEED portal implementation of an incident evaluation, training, and correction system to spot at-risk behavior, explain both the at-risk behavior and correct behavior, enforce the correct behavior, and document the incident that gave rise to the at-risk behavior in some embodiments.

Figure 15:
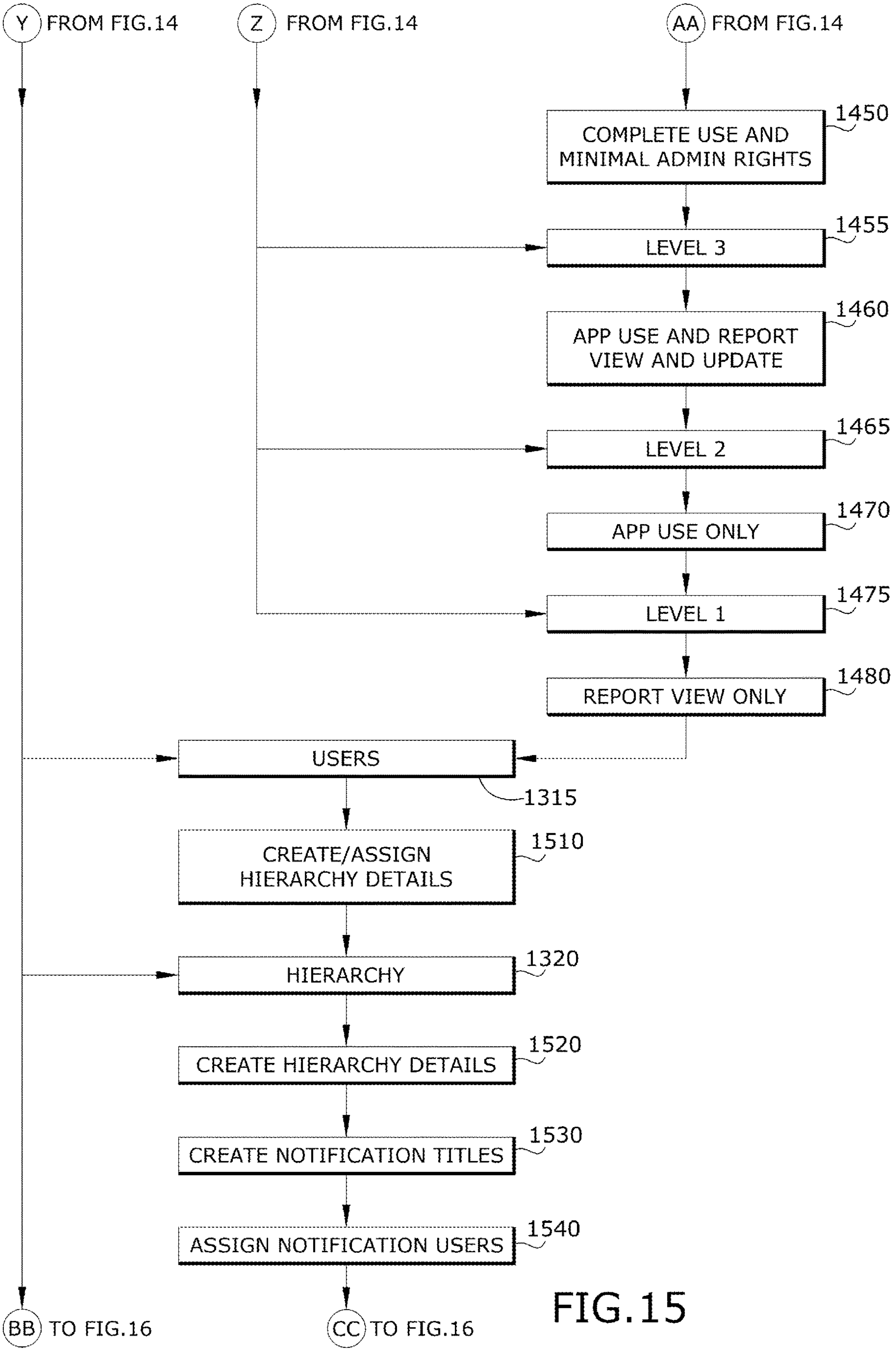

FIG. 15 conceptually illustrates a continuation of the detailed breakdown of the SEED portal implementation of the incident evaluation, training, and correction system of FIG. 14.

Figure 16:
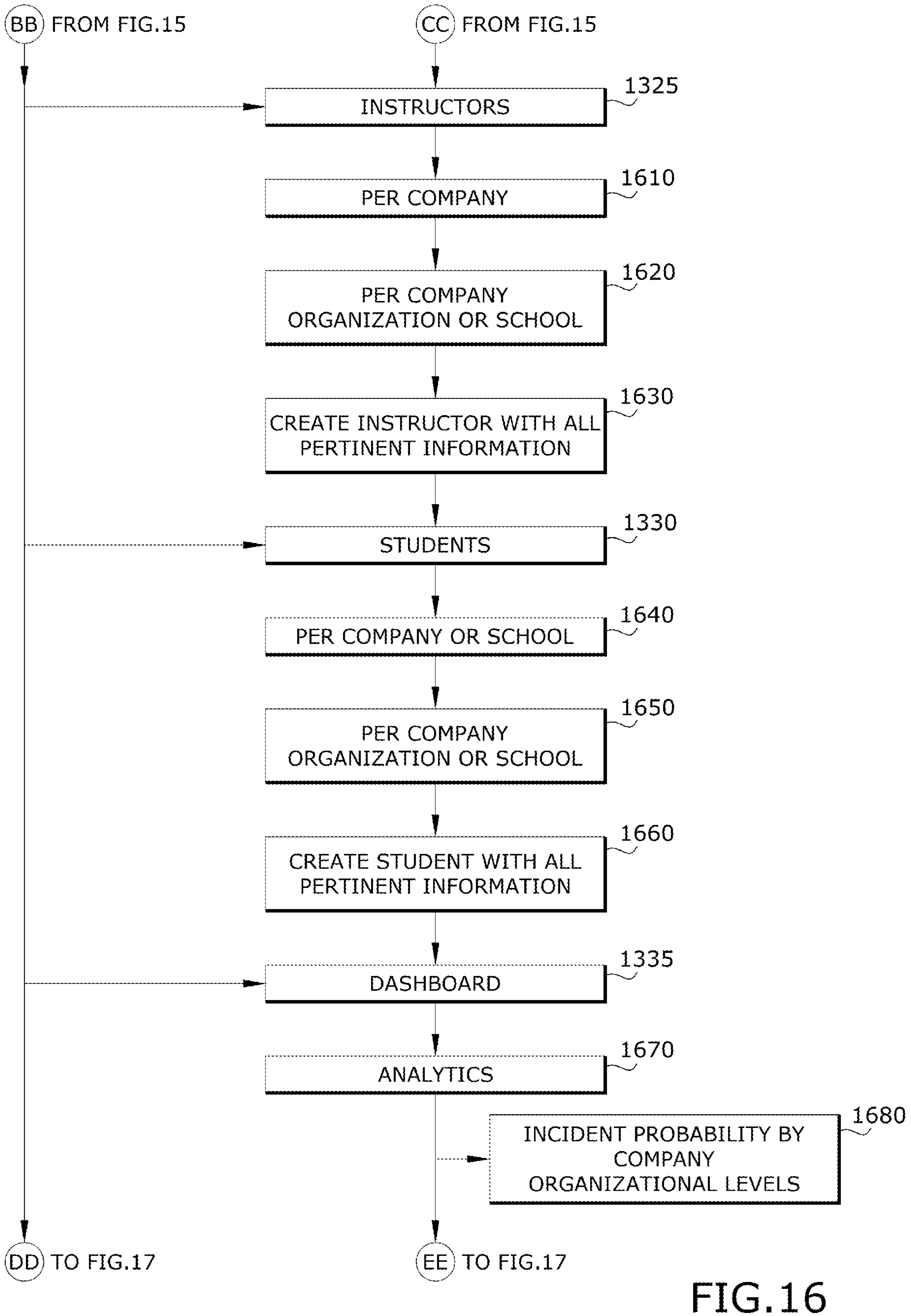

FIG. 16 conceptually illustrates a continuation of the detailed breakdown of the SEED portal implementation of the incident evaluation, training, and correction system of FIG. 15.

Figure 17:
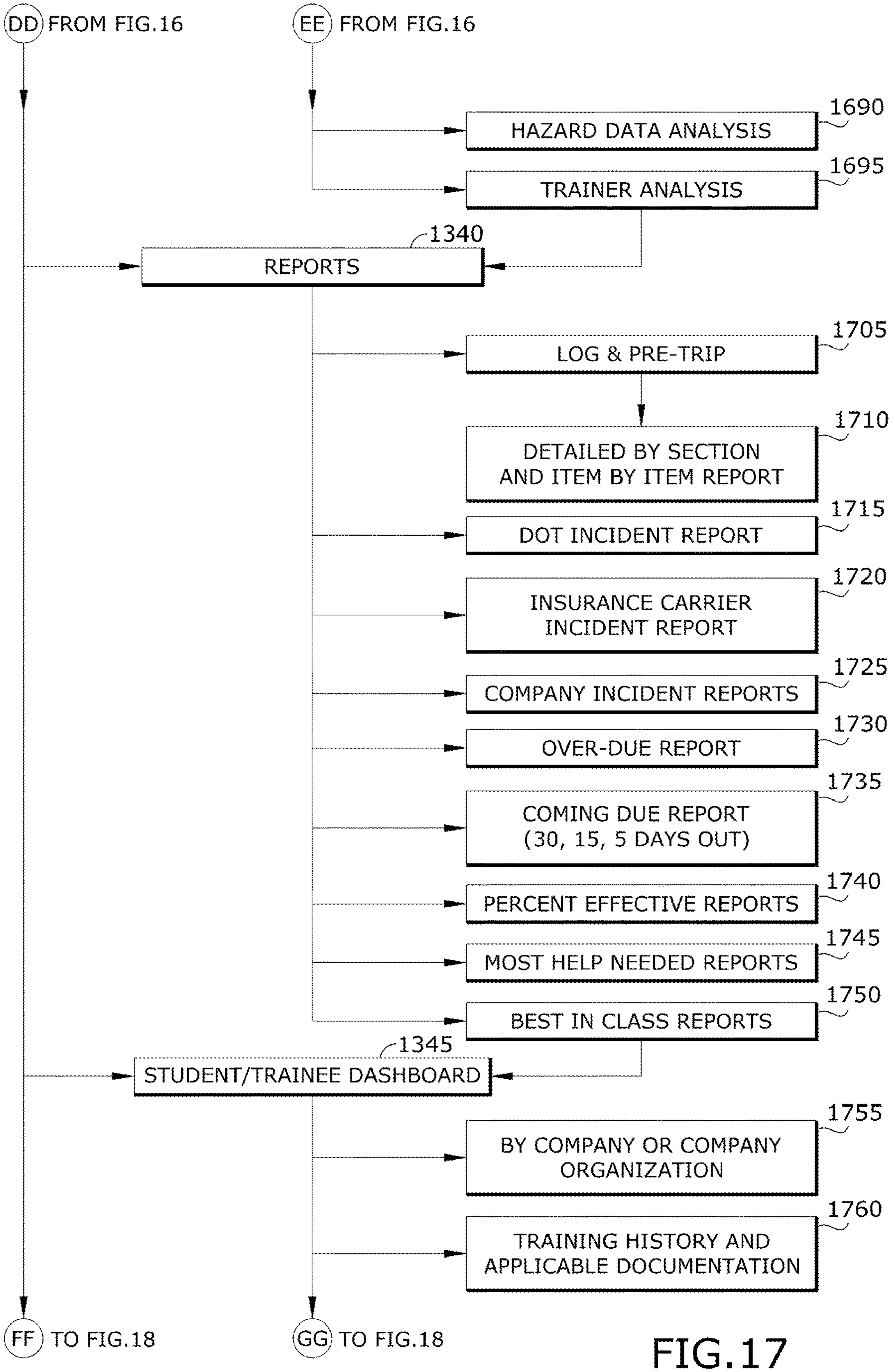

FIG. 17 conceptually illustrates a continuation of the detailed breakdown of the SEED portal implementation of the incident evaluation, training, and correction system of FIG. 16.

Figure 18:
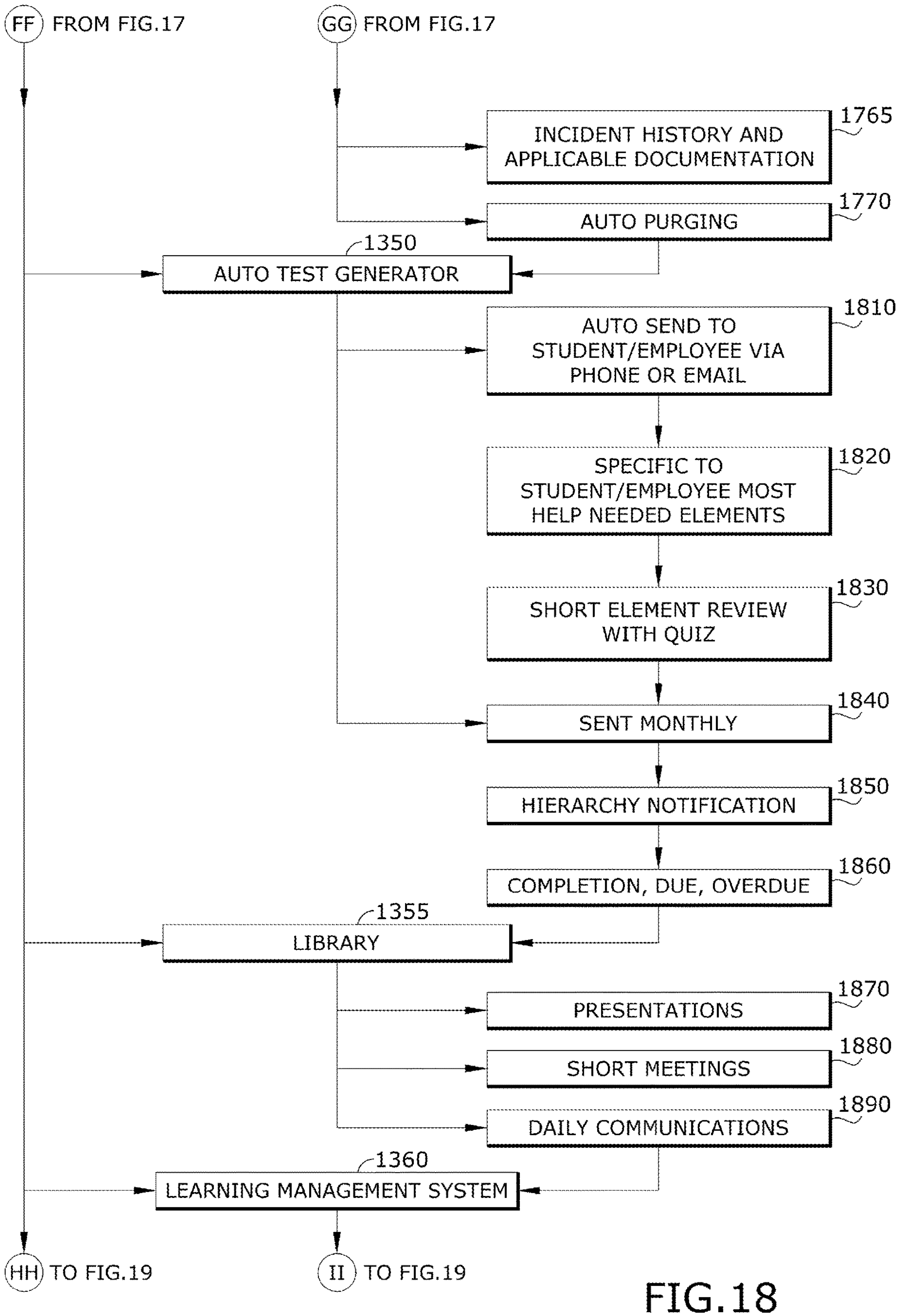

FIG. 18 conceptually illustrates a continuation of the detailed breakdown of the SEED portal implementation of the incident evaluation, training, and correction system of FIG. 17.

Figure 19:
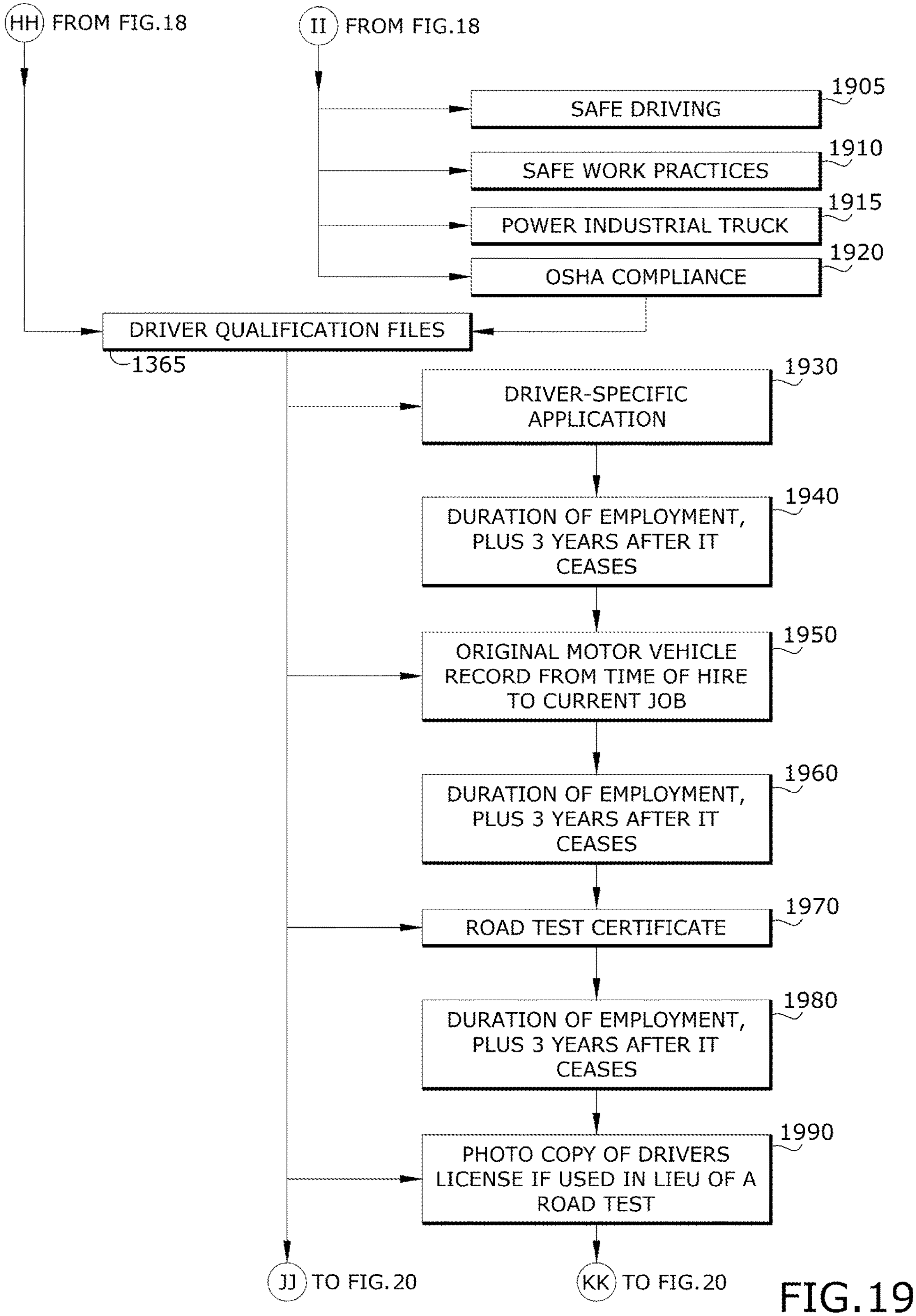

FIG. 19 conceptually illustrates a continuation of the detailed breakdown of the SEED portal implementation of the incident evaluation, training, and correction system of FIG. 18.

Figure 20:
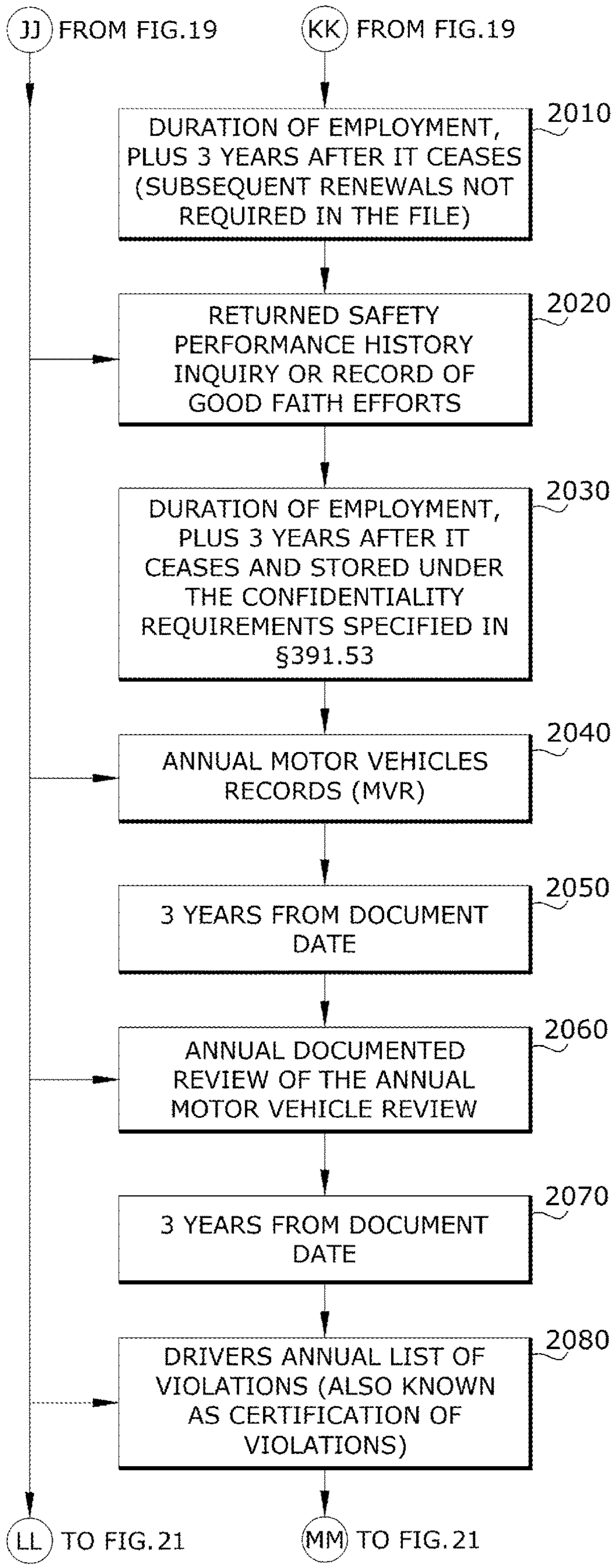

FIG. 20 conceptually illustrates a continuation of the detailed breakdown of the SEED portal implementation of the incident evaluation, training, and correction system of FIG. 19.

Figure 21:
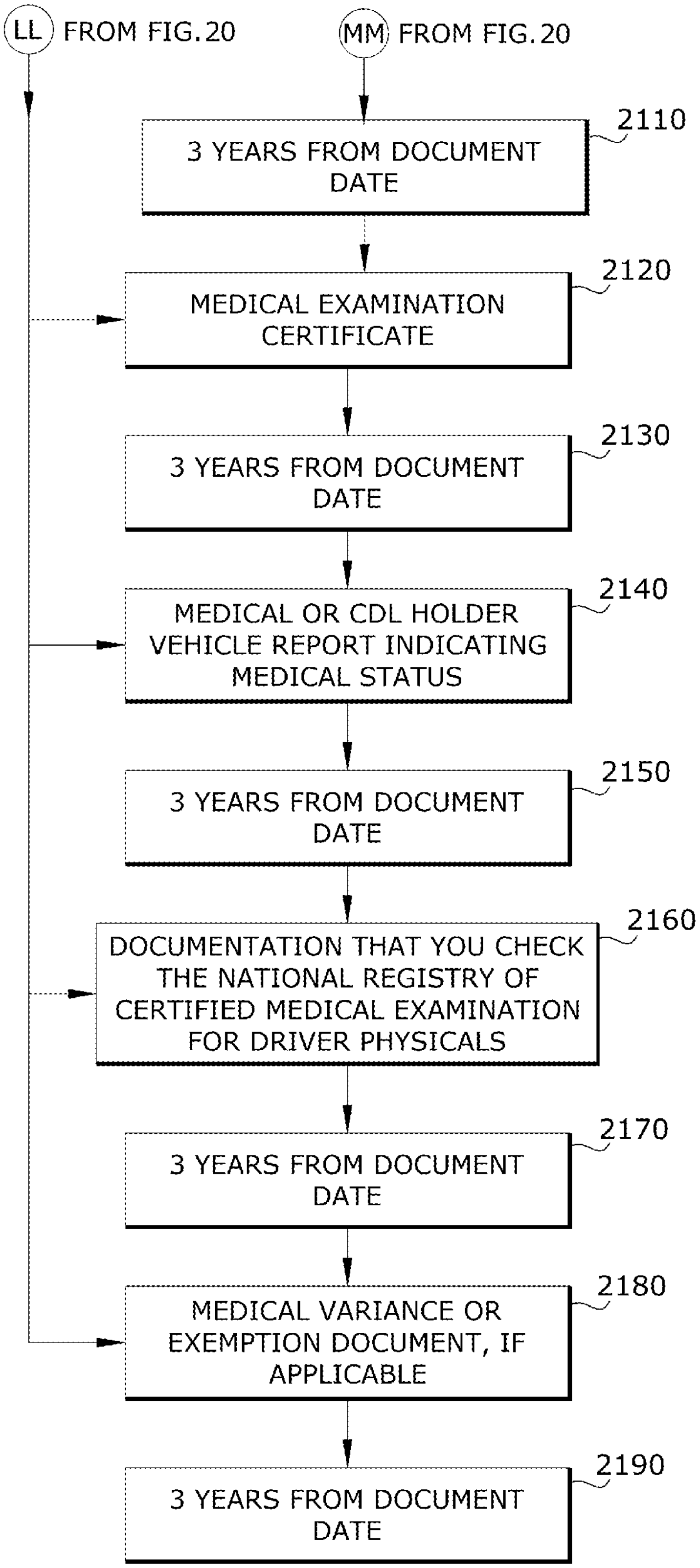

FIG. 21 conceptually illustrates a continuation of the detailed breakdown of the SEED portal implementation of the incident evaluation, training, and correction system of FIG. 20.

Figure 22:
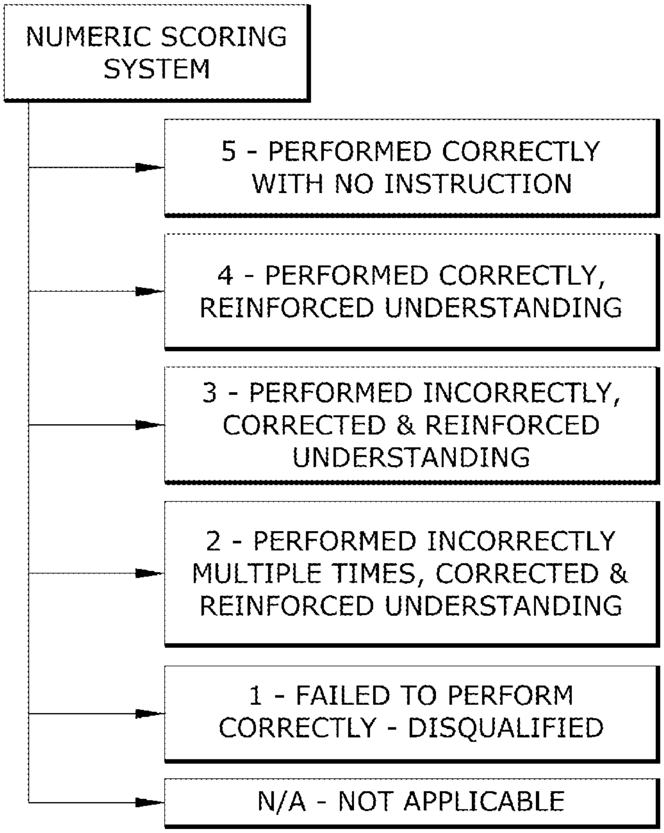

FIG. 22 conceptually illustrates an exemplary numeric scoring system used by the incident evaluation, training, and correction system and process to calculate scores in some embodiments.

Figure 23:
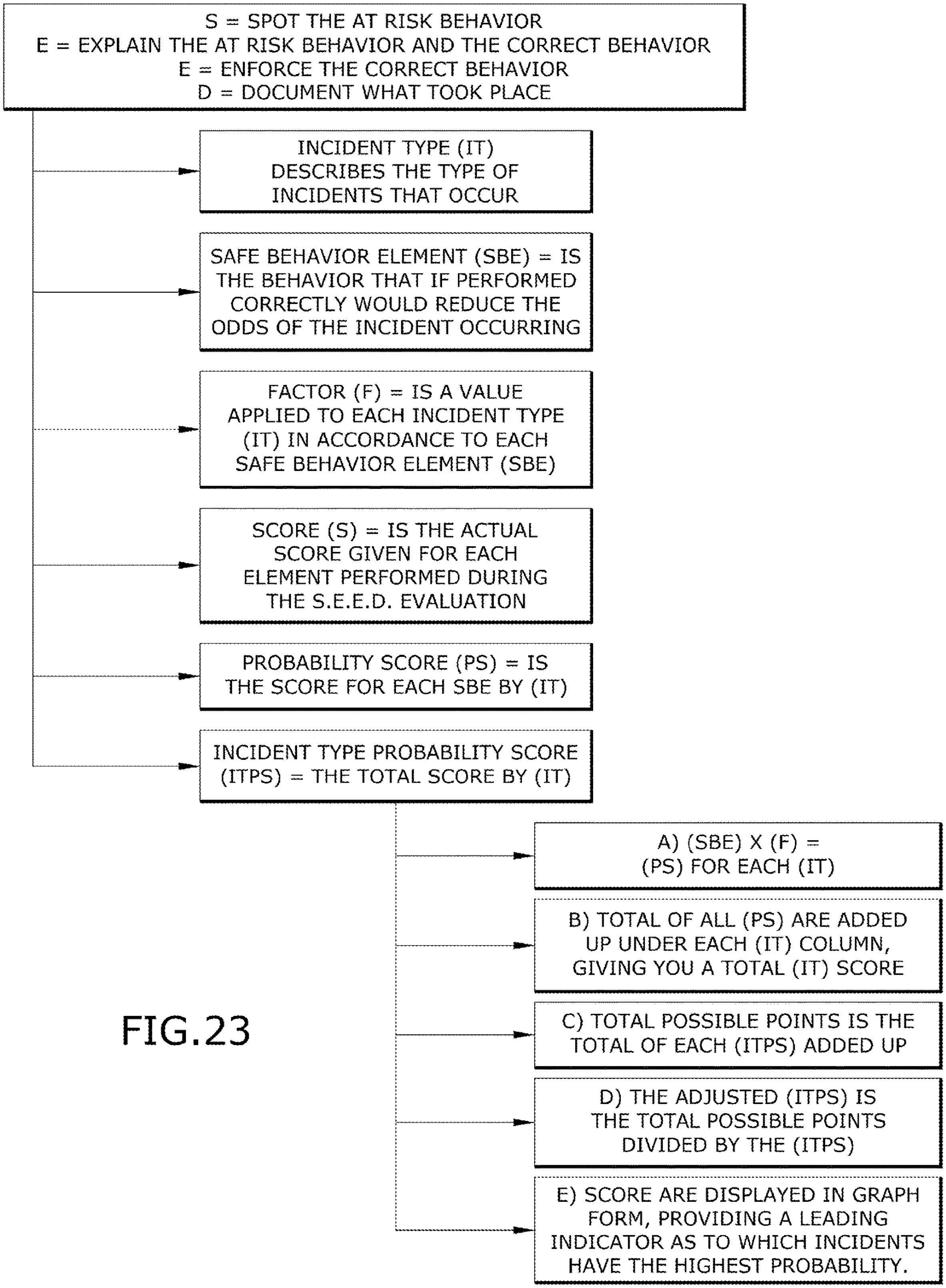

FIG. 23 conceptually illustrates a SEED algorithm implementation used by the incident evaluation, training, and correction system and process in some embodiments.

Figure 24:
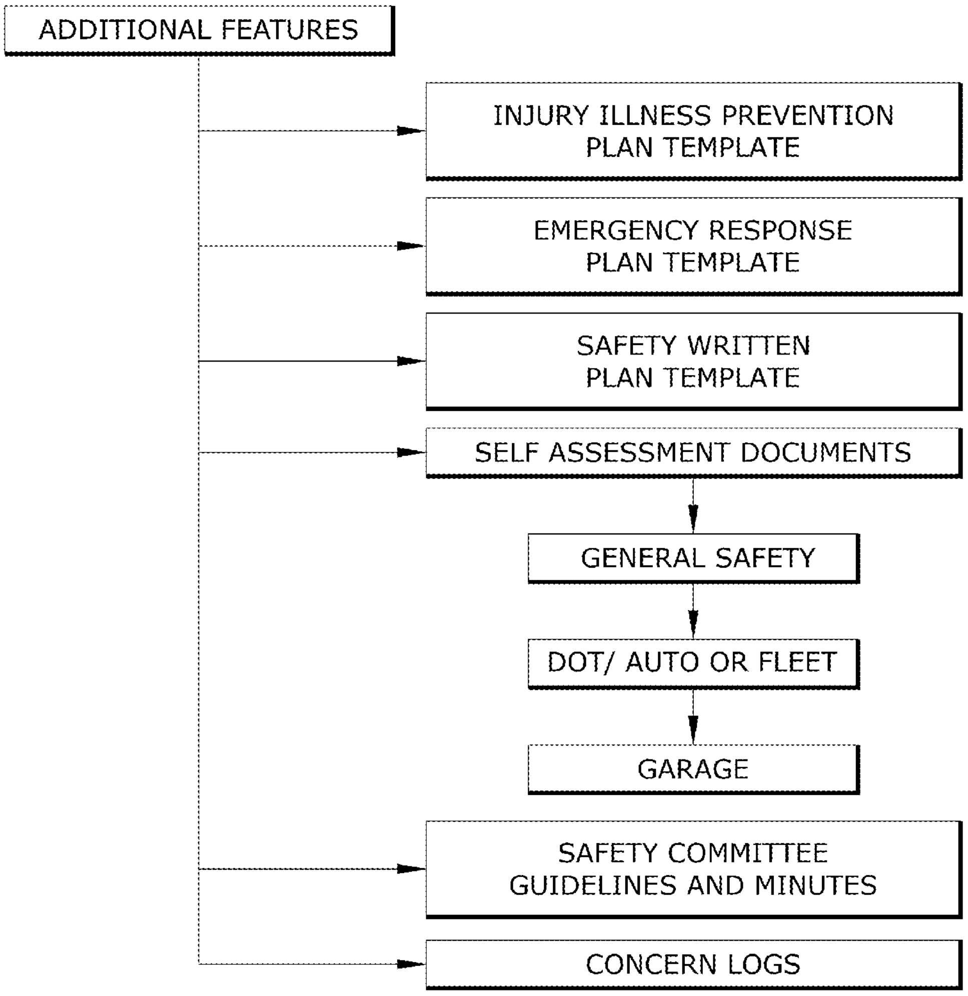

FIG. 24 conceptually illustrates additional features of the incident evaluation, training, and correction system and process in some embodiments.

Figure 25:
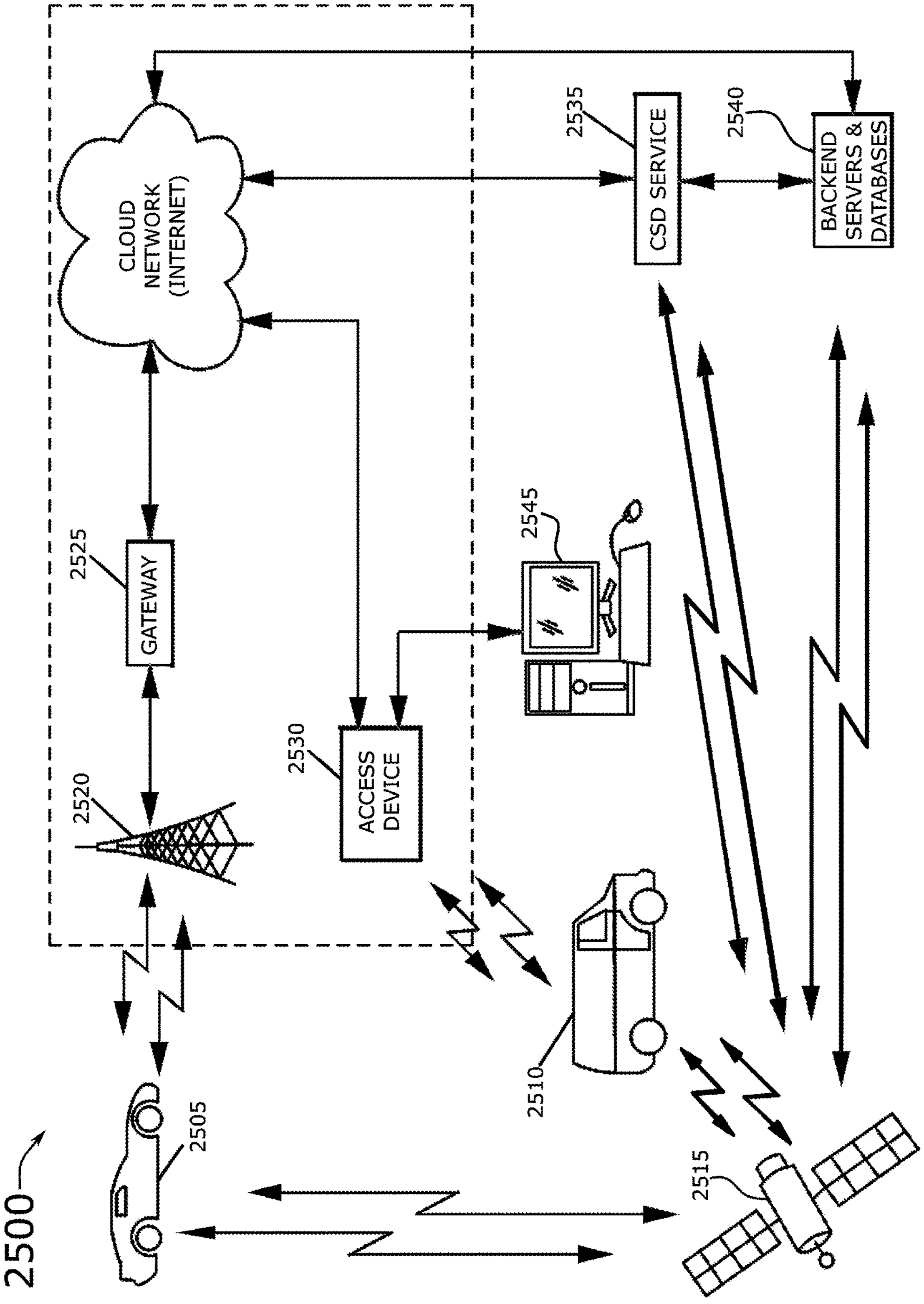

FIG. 25 conceptually illustrates a cloud computing software-as-a-service ("SaaS") cloud-computing network architecture over which an incident evaluation, training, and correction system is deployed in some embodiments.

Figure 26:
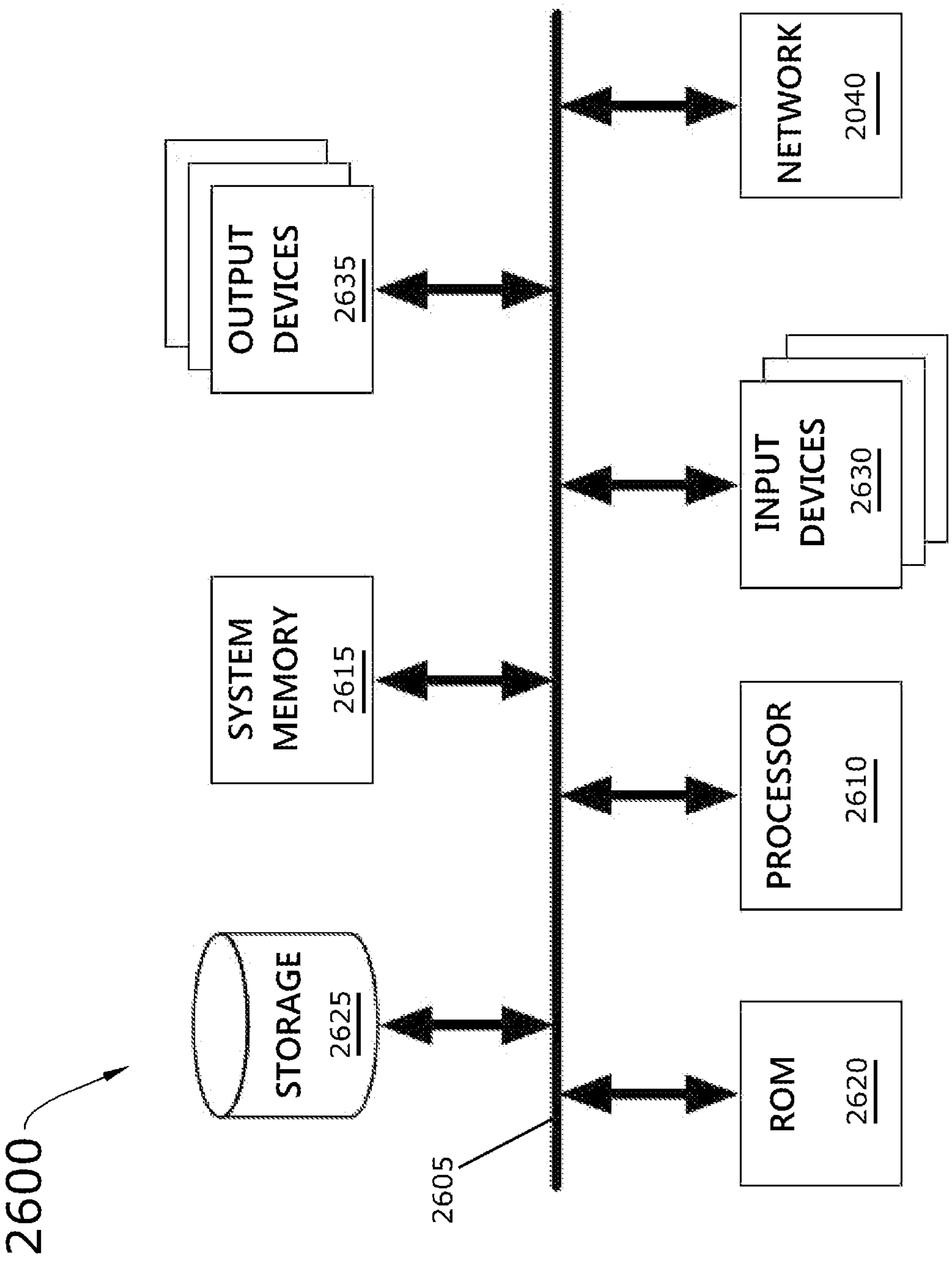

FIG. 26 conceptually illustrates an electronic system with which some embodiments of the invention are implemented.

DETAILED DESCRIPTION

In the following detailed description of the invention, numerous details, examples, and embodiments of the incident evaluation, training, and correction system to spot at-risk behavior, explain both the at-risk behavior and correct behavior, enforce the correct behavior, and document the incident that gave rise to the at-risk behavior are described. However, it will be clear and apparent to one skilled in the art that the invention is not limited to the embodiments set forth and that the invention can be adapted for any of several applications including, without limitation, defensive driving, care and caution in working environments, preventative care in communal environments, etc.

In this specification, "SEED" (or "S.E.E.D.") is an acronym that is short for "spotting, explaining, enforcing, and documenting" as used in connection with the phrases "spotting at-risk behavior, explaining both the at-risk behavior and correct behavior, enforcing the correct behavior, and documenting the incident that gave rise to the at-risk behavior" and "spot at-risk behavior, explain both the at-risk behavior and correct behavior, enforce the correct behavior, and document the incident that gave rise to the at-risk behavior".

Some embodiments of the invention include an incident evaluation, training, and correction process for spotting at-risk behavior, explaining the both at-risk behavior and correct behavior, enforcing the correct behavior, and documenting the incident that gave rise to the at-risk behavior (hereinafter also referred to as the "SEED process") and an incident evaluation, training, and correction system to spot at-risk behavior, explain both the at-risk behavior and correct behavior, enforce the correct behavior, and document the incident that gave rise to the at-risk behavior (hereinafter also referred to as the "SEED system"). In some embodiments, the SEED system includes a cloud-based training tool for coaching and reinforcement of defensive driver skills and knowledge. In some embodiments, the cloud-based training tool uses a scoring system that provides accuracy on knowledge and skills. In some embodiments, the cloud-based training tool is implemented as a software application. Examples of the software application implementation of the cloud-based training tool include, without limitation, a mobile app implementation and a web portal implementation.

Embodiments of the SEED process and the SEED system described in this specification solve problems in conventional, existing systems by automatically analyzing hazards based on incidents and behaviors and creating hazard data analysis reports without requiring numerous man hours to analyze incidents and information about an incident or behavior and create the analysis. In this way, the SEED process and the SEED system, along with the cloud-based training tool for coaching and reinforcement of defensive driver skills and knowledge, is able to improve measures used by a company or organization to correct dangerous behaviors and avoid situations that give rise to incidents, train and reinforce alternative better behaviors, and thereby reduce liability of the company or organization in court.

Embodiments of the SEED process and the SEED system, along with the cloud-based training tool for coaching and reinforcement of defensive driver skills and knowledge, described in this specification differ from and improve upon currently existing options. In particular, some embodiments of the SEED process and SEED system use state of the art algorithms that will help create hazard data analysis and probability of when an accident will occur. Furthermore the cloud-based training tool has a scoring system. In some embodiments, the scoring system is scaled from one to five (1-5), with five (5) being the best. In some embodiments, the scoring system is scaled based on a different numeric range, with a highest numeric value being the best. In some embodiments, the SEED process and the SEED system, along with the cloud-based training tool for coaching and reinforcement of defensive driver skills and knowledge, documents all training. In some embodiments, the SEED process and the SEED system, along with the cloud-based training tool for coaching and reinforcement of defensive driver skills and knowledge, documents each driver's vehicle turns and comes equipped with GPS.

The currently existing options do not provide any probability of suffering an accident or provide any indication of the driver's accuracy in or familiarity with driving knowledge and skills. By contrast, the SEED process and the SEED system, along with the cloud-based training tool for coaching and reinforcement of defensive driver skills and knowledge, uses a scoring system that provides accuracy on knowledge and skills. In some embodiments, the SEED process and the SEED system, along with the cloud-based training tool for coaching and reinforcement of defensive driver skills and knowledge, can also produce a record of driver training. In some embodiments, the SEED process and the SEED system, along with the cloud-based training tool for coaching and reinforcement of defensive driver skills and knowledge, provide a plurality of enhancement materials comprising at least a truck driving school agenda, path of life school agenda, distracted driver quizzes, truck school classroom instruction, and yard skills instruction.

The SEED process and the SEED system, along with the cloud-based training tool for coaching and reinforcement of defensive driver skills and knowledge, of the present disclosure may be comprised of the following elements. This list of possible constituent elements is intended to be exemplary only and it is not intended that this list be used to limit the SEED process and SEED system of the present application to just these elements. Persons having ordinary skill in the art relevant to the present disclosure may understand there to be equivalent elements that may be substituted within the present disclosure without changing the essential function or operation of the SEED process and SEED system, or the cloud-based training tool for coaching and reinforcement of defensive driver skills and knowledge.

1. Software application implementations the SEED process and the cloud-based training tool of the SEED system (the software being implemented to perform on any/all systems, but typically at least implementations of mobile app software and web portal software)

2. Computing device including, without limitation, mobile devices (iOS smartphones, Android smartphones, etc.), tablet computing devices, laptop computers, PC or desktop computers, notebook computers, etc.

3. Automated sub-systems and modules (also referred to as "BOTS" or "BOT technology" and/or automated algorithms)

4. Geospatial location devices and systems, including, without limitation, global positioning system (GPS) devices 5. Wireless connectivity (e.g., WiFi, cellular, Bluetooth, etc.) for online connectivity (but able to operate at least some of the software application implementations in offline mode without connectivity, such as the mobile app implementation).

By way of example, FIG. 1 conceptually illustrates a cloud-based training tool of a SEED system that performs a SEED process 100. As shown in this figure, the cloud-based training tool of the SEED system that performs the SEED process 100 generally works by a person interacting with SEED software 110, such as a mobile app, a web portal, desktop computer software application, etc., is able to be deployed to perform on any or all systems 120. The person (or "user") would interact with the cloud-based training tool of the SEED system that performs the SEED process 100 via a computing device 130, such as an iOS mobile device, an Android mobile device, a tablet computing device, a laptop computer, or a desktop computer, etc. While the SEED software 110 includes many aspects that are user-driven and/or require user input or feedback, the SEED software 110, as well as the backend modules, systems, and/or software implemented algorithms of the SEED system, include automated sub-systems and modules or BOT technology 140. Furthermore, the user's computing device 130 would typically include a geospatial location device, such as a GPS receiver 150, in implementations of the app. In this way, a user who is a driver of a vehicle may carry his or her mobile device with GPS in order for the SEED app to capture location information and turn-by-turn route patterns, which are transmitted wirelessly to the SEED system in realtime, or (when offline) captured by the SEED app and uploaded to the SEED system when the mobile device of the driver is connected to the SEED system. This ability to perform in online and offline mode 160 ensures that the cloud-based training tool of a SEED system that performs a SEED process 100 is capable of operating when there is no strong wireless (WiFi or cellular) signal, or otherwise no ability to connect or detect signal connectivity to the SEED system. The SEED software 110 shown in this example includes an example of a SEED app 170 and a SEED portal 180. While the user commonly will use a cell phone (smartphone) to open the SEED app 170 (and may optionally open the SEED portal 180), the other computing devices 130 are possible to connect to the SEED portal 180, so long as the computing device 130 of the user is able to make wireless WiFi connection via a strong wireless connection or a data connection by wire (e.g., Ethernet). In this way, it is possible for the user to instead use a laptop, with internet connection and battery charged. Similarly, it is possible to use a PC as long as there is a power outlet and internet connection (or battery charged), or as another alternative, a tablet computing device with internet connection and battery charged.

As noted above by reference to FIG. 1, the cloud-based training tool for coaching and reinforcement of defensive driver skills and knowledge of the present disclosure generally works by a person interacting with the SEED app 170. A high level breakdown of the SEED app 170 is described below, by reference to FIG. 2. Furthermore, a detailed breakdown with exemplary options in the SEED app 170 is described below, by reference to FIGS. 3-12. Additionally, a high level breakdown of the SEED portal 180 is described below, by reference to FIG. 13 while a detailed breakdown with exemplary options in the SEED portal 180 is described below, by reference to FIGS. 14-21. In some embodiments, the SEED app includes a plurality of selectable and automatically input options covering general information, equipment, eye movement, pre-trip, on-road (or behind the wheel) evaluation, production evaluation, vehicle road test evaluation, safe work practices, truck driving school, history, and notes. Once the device is on and the app is functional, the user may fill out the name of the company and the steps if required to create the different divisions, hubs or offices, supervisor groups and supervisors, as well as other information. The app then goes into the equipment section, eye movement section, and then the pre-trip evaluation and coaching section, followed by behind the wheel evaluation and coaching, production, vehicle road test, and the safe work practices. If needed, truck driving school offers opportunity to be certifications (e.g., Class A, Class B, etc.). For example, the user may be a driver who already completed name of company and other information, as well as equipment, and therefore, starts by interacting with the SEED app with twenty-one (21) selections for pre-trip evaluation and coaching (within which the SEED app may present over 120 selections with instructions), as well as behind the wheel (on-road) evaluation and coaching, in which there are at least twenty-one (21) items (and within that there are over 141 selections and instructions), and an eye triangle movement test, which tracks the eye movements of a driver.

By way of example, FIG. 2 conceptually illustrates a high level breakdown of a SEED app implementation 200 of an incident evaluation, training, and correction process for spotting at-risk behavior, explaining the both at-risk behavior and correct behavior, enforcing the correct behavior, and documenting the incident that gave rise to the at-risk behavior in some embodiments. In describing the high level breakdown of the SEED app implementation 200, reference is made to FIGS. 3-12, which illustrate a detailed breakdown of the SEED implementation. Starting with the SEED app 170 as shown in this figure, the high level breakdown of the SEED app implementation 200 includes an information page 205, an equipment module 210, an eye movement module 220, a pre-trip evaluation and coaching module 230, a behind the wheel evaluation and coaching module 240, a production module 250, a vehicle road test module 260, a safe work practices module 270, a truck driving school module 280, a history module 290, and a notes page 295.

In some embodiments, the information page 205 is a section of the SEED app implementation 200 that allows the user to make several selections pertaining to company/organization and employees or students involved in training, evaluation, and/or coaching. This is demonstrated in greater detail by reference to FIG. 3, which conceptually illustrates a detailed breakdown of a SEED app implementation of an incident evaluation, training, and correction process for spotting at-risk behavior, explaining the both at-risk behavior and correct behavior, enforcing the correct behavior, and documenting the incident that gave rise to the at-risk behavior in some embodiments. As shown in FIG. 3, the user interacts with the information page 205 to select a company (at 305), select a subject status as one of a student or an employee (at 310), make a selection of either a single student or employee (at 315) or a group of students or employees (at 320), input pertinent information about each student or employee (at 325), enter driver credentials (at 330) such as license number, expiration data, state, license class, and any applicable endorsements, provide medical examination card information (at 335) by scanning and uploading image of card and entering associated information, such as department of transportation (DOT) card expiration if applicable, select corrective lens requirement (at 340) if so required, and enter corrective lens requirement values and restrictions (at 345) when corrective lens requirement is selected.

In some embodiments, when the user logs into the system and accesses the information page 205, the SEED app may automatically populate an instructor or trainer field associated with the user's logon (at 350). In other cases, the user manually enters or selects an instructor or trainer (at 350). When the instructor or trainer is manually selected or automatically populated (at 350), the SEED app may allow the user to select a type of training, evaluation, or coaching (at 355). The result of selecting the type of training, evaluation, or coaching is described by reference to FIG. 4, which conceptually illustrates a continuation of the detailed breakdown of the SEED app implementation of the incident evaluation, training, and correction process of FIG. 3. As shown, the SEED app may auto populate previously known information from the user including equipment, pre/post trip information, behind the wheel, eye movement (test and tracking), safe work practices, production, vehicle road test, and history (at 360). Next, the user interacts with the information page 205 to select a reason for training, evaluation, or coaching (at 365), which can be made from a set of options including 'new hire', 'near miss' (near accident), 'incident follow-up', 'change of job', 'change of equipment', and 'annual certification' (at 370). The user is prompted to include dates for any injury/illness, accident/crash, light duty/TAW, and/or lost time/DART (at 375).

Turning back to FIG. 2, the equipment module 210 runs within the SEED app implementation 200 to allow the user to specify equipment information. This is demonstrated in greater detail by reference to FIG. 4, under equipment 210, where the user can specify a power unit (at 405), a unit number, type, and manufacturer (at 410), a combination of vehicles, train, or chain (at 415), a trailer length and gear type (at 420), and equipment number or numbers (at 425).

Referring again to FIG. 2, the eye movement 220 runs within the SEED app implementation 200 to allow the user to activate eye movement tracking. This is demonstrated in greater detail by reference to FIG. 4, under eye movement 220, and by reference to FIG. 5, which conceptually illustrates a continuation of the detailed breakdown of the SEED app implementation of the incident evaluation, training, and correction process of FIG. 4. As shown in FIG. 4, when the user selects eye movement 220 from the SEED app implementation 200, the user can start easy touch screen tracking 430. Turning to FIG. 5, the user can then start and stop time tracking (at 435). The SEED app implementation 200 of some embodiments will identify a number of priority items during tracking (at 440) and track the number of mirror and gauge checks (at 445), followed by eye movement tracing (at 450). The results are sent in an instant email (at 455) that is automatically generated and sent to key personnel. Specifically, the instant email is sent to "relevant parties" which is determined on a company-by-company or school-by-school basis, so that the instant email will be sent to key personnel or instructors such as, without limitation, a driving instructor, a supervisor, a compliance director, internal personnel who communicate with insurance adjusters, in-house or external legal counsel, business executives, school directors or board members, etc.

Now back to FIG. 2, the pre-trip evaluation and coaching module 230 runs within the SEED app implementation 200 to allow for user interaction with pre-trip evaluation and coaching. This is demonstrated in greater detail by reference to FIG. 5, under pre-trip 230, which is detailed by section and item by item (at 505) and is specific to a vehicle type (at 510). There is an icon to view instructions for each item (at 515), and includes scoring by way of a numeric scoring system 520.

An example of the numeric scoring system is demonstrated in FIG. 22. As shown in this figure, the numeric scoring system includes a range of values 1-5 which relate to scores for driving behavior compliance, used during evaluation or coaching, and being applied to one or more items of a potential group of driving behaviors for a driver. Specifically, the range of values 1-5 for the numeric scoring system shown in this figure includes a value of '5' when an item is performed correctly with no instruction. The numeric scoring system also includes a value of '4' when an item is performed correctly, but includes reinforcement of understanding. The value of '3' is included in the numeric scoring system of this figure when an item is evaluated to be performed incorrectly, and when corrected and reinforced understanding is applied or instructed. The numeric scoring system also includes a value of '2' when an item is performed incorrectly on multiple occasions, and corrected and reinforced understanding has been applied. A lowest value for the numeric scoring system in this figure is the value of '1', which is the score as evaluated when an item is failed to be performed correctly, is not performed at all, or is disqualified in some way (such as an effort to cheat, obscure, or render the item in a state that cannot be evaluated).

Finally, the numeric scoring system in this example includes a default catch-all when none of the values in the range of values 1-5 is appropriate or needed, shown as a 'not applicable' or 'N/A' option. While the numeric scoring system shown in FIG. 22 is isolated from other steps of other processes and separated from particular modules of other systems, it is noted here that the numeric scoring system shown in FIG. 22 can be incorporated into any such process that needs scoring of driver, student, or employee behavior over a range of values 1-5 that relate to a level of behavior compliance (such as driving behavior compliance). Furthermore, in many instances, a specific scoring system that is different from the numeric scoring system shown in FIG. 22 may be incorporated or used. In some cases, the numeric scoring system is used as shown in this figure, but is updated, adapted, or reconfigured after being incorporated into a process, app, portal, software, or system.

Turning back to FIG. 5, the numeric scoring system 520 includes the range of values 1-5 that relate to scores of a driver, student, or employee based on driver behavior as evaluated. The pre-trip 230 evaluation and/or coaching scores each item in each section with a value from the range of values 1-5, or enters the default catch-all 'N/A'. Specifically, the range of values 1-5 for the numeric scoring system 520 shown here include the value of '5' when an item is performed correctly with no instruction (at 525), the value of '4' when an item is performed correctly, but includes reinforcement of understanding (at 530).

Now, turning to FIG. 6, which conceptually illustrates a continuation of the detailed breakdown of the SEED app implementation of the incident evaluation, training, and correction process of FIG. 5, the numeric scoring system 520 includes the value of '3' when an item is performed incorrectly, with corrected and reinforced understanding applied (at 535). Next in the range of values 1-5 for the numeric scoring system 520 is the value of '2' when an item is performed incorrectly on multiple occasions, and corrected and reinforced understanding has been applied (at 540). At the bottom of the range of values 1-5 for the numeric scoring system 520 is the value of '1' when an item is failed to be performed correctly, not performed, or disqualified, as described above by reference to FIG. 22. Finally, the numeric scoring system 520 in this pre-trip section includes the default catch-all when none of the values in the range of values 1-5 is appropriate or needed, shown as the 'not applicable' or 'N/A' option (at 550).

After processing or completing values in the numeric scoring system 520 (or bypassing them as 'N/A'), the pre-trip 230 section of the SEED app implementation 200 includes a user-selectable document preview option (at 555). When document preview 555 is started, the user is taken through a preview of section scoring by item (at 560), a preview of total score and percent effective (565), electronic signature and initializing per page of the document (at 570), instructions and notes per item that is specific to the student/employee (at 575), a preview of a critical item graph (580), and a graph of score by each section (at 585). After document preview 555, the pre-trip 230 section of the SEED app implementation 200 includes automated preparation and sending of the instant email (at 590) to the relevant parties (as described above).

Referring back to FIG. 2, the behind the wheel evaluation and coaching module 240 runs within the SEED app implementation 200 to spot, explain, educate, and document driver behavior while driving (e.g., "behind the wheel" of a service car, company van, delivery truck, etc.). Documenting "behind the wheel" driver behavior is described in further detail by reference to FIG. 7, which conceptually illustrates a continuation of the detailed breakdown of the SEED app implementation of the incident evaluation, training, and correction process of FIG. 6, and by further reference to FIG. 8, which conceptually illustrates a continuation of the detailed breakdown of the SEED app implementation of the incident evaluation, training, and correction process of FIG. 7.

Several aspects of driver behavior while driving are delineated and documented by the behind the wheel evaluation and coaching module 240 of the SEED app implementation 200. Referring first to FIG. 7, the behind the wheel evaluation and coaching module 240 methodically completes all items in detail on a section by section and item by item basis (at 705) and also covers safe driving elements on an item by item basis (at 710). Critical information captured by the behind the wheel evaluation and coaching module 240 for a particular driver includes the specific vehicle type used by the driver, the driver's license class, and identity of passengers (if any) accompanying the driver (at 715) on the present trip. The behind the wheel evaluation and coaching module 240 also presents an icon on a behind the wheel view/page of the SEED app implementation, which when selected, allows the user to view instructions for each item (at 720). Again, the numeric scoring system 520 is employed to score each "behind the wheel" item, with the range of values 1-5 and a default catch-all 'N/A' option 550, when a score is inapplicable. In this case, the numeric scoring system 520 is similar to the numeric scoring system described above, by reference to FIG. 22. However, in some embodiments, the numeric scoring system is updated, adapted, changed, or reconfigured in some manner but remains incorporated in the process, system, software, app, or portal.

Now referring to FIG. 8, the behind the wheel evaluation and coaching module 240 evaluates and marks all turns on a turn-by-turn basis throughout the trip, with each turn plotted and numbered on a map generated based on location information determined by an onboard GPS device and corresponding remarks about each numbered turn being documented (at 725) by the behind the wheel evaluation and coaching module 240. For instance, a driver of a truck may follow a delivery route that includes several turns between an origin (starting point) and a destination (delivery point), and the driver's smartphone with a SEED mobile app may be running and capturing GPS location data during the entire delivery route trip, and may determine whether each turn is 'OK', 'WIDE', or 'SHORT' based on a known map route and the realtime GPS location data captured while engaging the vehicle to turn—the SEED mobile app of some embodiments calculates a turn path based on several GPS data points for each turn, and compares the calculated turn path of each turn with a corresponding model turn based on the route, the vehicle type, known road conditions (uphill turn, downhill turn, turning onto a multi-lane road, uneven road or potholes in road along turn path, etc.). The corresponding model turn is considered an ideal turn for the vehicle type and other known road conditions, and approximate compliance of the driver's actual turn path (as calculated) to the corresponding model turn is marked as 'OK'. In some embodiments, approximate compliance includes exact matching of the actual turn path and the corresponding model turn with an allowed deviation from the corresponding model turn of a certain percentage that is configurable by an administrator or other authorized user. For instance, the percentage may be configured to allow for ten percent deviation between the driver's actual, GPS-based calculated turn path and the corresponding model turn. Similarly, the driver's actual turn path may be considered 'WIDE' or 'SHORT' when the actual turn path deviates too loosely (for 'WIDE' turns) or too sharply (for 'SHORT' turns)— exceeding the permitted deviation percentage as configured.

Continuing with FIG. 8, the behind the wheel evaluation and coaching module 240 includes a section menu (at 730) for each "behind the wheel" section, and an option for document preview (at 735) as a user-selectable tool or menu option. When document preview (at 735) is selected, the behind the wheel evaluation and coaching module 240 takes the user through document preview according to section scoring by item (at 740), total score and percent effective (745), electronic signature and initializing per page of the document (at 750), instructions and notes per item which depends on who the student or employee is (at 755), a preview of an incident probability graph (760) that is based on the turn-by-turn results and overall GPS route as mapped during the driver's journey, and a graph of score by each section (at 765). After "behind the wheel" document preview 735 is completed, the behind the wheel evaluation and coaching module 240 of the SEED app implementation 200 includes automated preparation and sending of instant email (at 770) to the "relevant parties" defined above.

Referring back to FIG. 2, the production module 250 runs within the SEED app implementation 200 to spot, explain, educate, and document other aspects of driver behavior beyond pre-trip behavior and behind the wheel behavior. Production is described by reference to FIG. 8, and in further detail by reference to FIG. 9, which conceptually illustrates a continuation of the detailed breakdown of the SEED app implementation of the incident evaluation, training, and correction process of FIG. 8. Referring first to FIG. 8, the production module 250 evaluates and documents timeliness and performs a start day evaluation (at 810). The production module 250 also performs mileage tracing (at 820) based on GPS location data and resulting maps that are generated of the routes driven by a given driver. Also, the production module 250 completes the evaluation on a step-by-step basis (at 830).

Now turning to FIG. 9, the production module 250 moves on to document preview (at 840) and electronic signature and initialing of each page of the document (at 850). Upon completion of the production section, the production module 250 automatically generates and sends an instant email (at 860) to the relevant parties (as described above).

Referring back to FIG. 2, the vehicle road test module 260 runs within the SEED app implementation 200 to spot, explain, educate, and document other aspects of driver behavior beyond pre-trip behavior, behind the wheel behavior, and production details. Aspects of the vehicle road test module 260 are described by reference to FIG. 9. Specifically, the vehicle road test module 260 performs evaluation on a detailed section-by-section and item-by-item basis (at 910). The vehicle road test module 260 first captures the critical information about the road test, including the specific vehicle type, the driver's license class (A, B, or C), and any passenger information (at 920) when a passenger is accompanying the driver in the vehicle during the actual vehicle road test. For instance, a driving instructor may be a passenger of an employee driver performing an actual vehicle road test of a new truck intended to be used for deliveries by a company. The vehicle road test module 260 also presents an icon for each item to view instructions for each item (at 930). The vehicle road test module 260 then performs scoring by way of a specific scoring system (at 940). In this example, the vehicle road test module 260 includes the specific scoring system 940 which is different from the numeric scoring system 520 (and as shown in FIG. 22) by being tailored to the requirements of a State Department of Motor Vehicles ("DMV"). As described above, by reference to FIG. 22, a specific scoring system may be used which is different from the numeric scoring system 520 or the numeric scoring system shown in FIG. 22. However, in some embodiments, the vehicle road test module 260 is configured to use the numeric scoring system 520, which is subsequently changed or adapted in some way to render a difference, thereby noted as a 'specific scoring system'.

After scoring is completed, the vehicle road test module 260 determines whether the driver passes/fails or is otherwise qualified/unqualified (at 950) which is based on the scores from the specific scoring system 940 as evaluated during the actual vehicle road test. The scores and the determination of passing/failing or qualified/unqualified are transmitted to the DMV for acceptance (at 960). After the DMV accepts the results, the vehicle road test module 260 moves ahead to document review (at 970), followed by electronic signature and initializing as needed (at 980), and finally, automatic generation and transmission of the instant email (at 990) to the relevant parties.

Again in reference to FIG. 2, the safe work practices module 270 runs within the SEED app implementation 200 to spot, explain, educate, and document aspects of safe work practices by and for employees. Aspects of the safe work practices module 270 are described by reference to FIG. 10, which conceptually illustrates a continuation of the detailed breakdown of the SEED app implementation of the incident evaluation, training, and correction process of FIG. 9. Specifically, the safe work practices module 270 performs evaluation on a detailed section-by-section and item-by-item basis (at 1005). The safe work practices module 270 first covers general safety elements (at 1010) and includes an icon for each item to view instructions (at 1015). In evaluating each item in each section of safe work practices, the safe work practices module 270 uses a specific scoring system (at 1020) to score each item. The specific scoring system 1020 includes values in a range of 1-5, including the value '5' for correct performance of item with no instruction (at 1025), the value of '4' for correct performance of item with reinforced understanding (at 1030), the value of '3' for incorrect performance of item that is corrected and includes reinforced understanding (at 1035), a value of '2' for incorrect performance of the item on multiple occasions with correction and reinforced understanding (at 1040), and the value of '1' for failure to perform the item correctly and disqualification (at 1045).

In this case, the specific scoring system 1020 is nearly the same as the numeric scoring system 520, described above by reference to FIGS. 5 and 6, and shown in FIG. 22, with a single difference being that the specific scoring system 1020 does not include a default catch-all option 550 in which the score of an item can be marked in the document as 'N/A' or 'not applicable'. Thus, the specific scoring system 1020 has likely be adapted from the numeric scoring system 520, by removal of the default catch-all option for 'N/A' 550.

Moving on, the safe work practices module 270 includes document review (at 1050), which includes section scoring by item (at 1055) and several other sub-sections which are described by reference to FIG. 11. Specifically, FIG. 11 conceptually illustrates a continuation of the detailed breakdown of the SEED app implementation of the incident evaluation, training, and correction process of FIG. 10. As shown in this figure, the document review (at 1050) includes total score and percent effective (at 1060), electronic signature and initializing per page of the document (at 1065), interaction noted per item which is specific to the student or employee (at 1070), an incident probability graph (1075) based on the safe work practices scoring of items, and score by section graph (at 1080).

Now turning back to FIG. 2, the truck driving school module 280 runs within the SEED app implementation 200 to spot, explain, educate, and document truck driving school aspects. The truck driving school module 280 includes several sub-sections, some of which are described by reference to FIG. 11, and others which are described by reference to FIG. 12, which conceptually illustrates a continuation of the detailed breakdown of the SEED app implementation of the incident evaluation, training, and correction process of FIG. 11. As shown in FIG. 11, the truck driving school module 280 includes driver's license class type sub-sections, including "Class A" license (at 1105) and "Class B" license (at 1110). The truck driving school module 280 includes options for school duration including a first option for truck driving school that is completed in five to seven days (at 1115), a second option for truck driving school that is completed in seven to ten days (at 1120), and a third option for truck driving school that is completed in ten to fifteen days (at 1125). The truck driving school module 280 includes a selectable record of training documentation (at 1130), and information regarding a classroom (at 1135) in which classroom instruction is scheduled to take place, as well as a section covering theory (at 1140) for the instruction to take place. In reference to FIG. 12, the truck driving school module 280 also includes a sub-section to perform testing and knowledge check (at 1145). The truck driving school module 280 also includes a link to vehicle inspection documentation (at 1150), a link to yard skills documentation (at 1155), and a link to behind the wheel documentation (at 1160) that includes documentation of real world driving. The behind the wheel documentation 1160 includes links to both skills (at 1165) and defensive driving (at 1170). Finally, the truck driving school module 280 includes a DMV quality road test section (at 1175).

In FIG. 2, the history module 290 and the notes page 295 run within the SEED app implementation 200 to spot, explain, educate, and document historical records and notes. The history module 290 and the notes page 295 are described by reference to FIG. 12. As shown in this figure, when the history module 290 is selected from the SEED app implementation 200, student training evaluation and review is shown which highlights weak areas and strong areas (at 1210). When the notes page 295 is selected from the SEED app implementation 200, the user is provided the ability to make specific notations (at 1220).

While the examples described above by reference to FIGS. 3-12 refer to detailed information about and aspects of the high level breakdown of the SEED app implementation 200 of the incident evaluation, training, and correction process for spotting at-risk behavior, explaining the at-risk behavior and educating about the correct behavior, enforcing the correct behavior, and documenting the incident that gave rise to the at-risk behavior, other implementations and options are possible, including implementations of the incident evaluation, training, and correction process in software, web apps, mobile apps, cloud-based application services (e.g., software-as-a-service or "SaaS" cloud-computing implementations), portals, and other such implementations, some of which are deployed as systems. An example of a SaaS cloud-computing implementation of the incident evaluation, training, and correction system is described further below, by reference to FIG. 25.

In the next section, which is described by reference to FIGS. 13-21, a portal implementation is described. By way of example, FIG. 13 conceptually illustrates a high level breakdown of a SEED portal implementation of an incident evaluation, training, and correction system 1300 to spot at-risk behavior, explain both the at-risk behavior and correct behavior, enforce the correct behavior, and document the incident that gave rise to the at-risk behavior. As shown in this figure, the SEED portal implementation of an incident evaluation, training, and correction system 1300 includes a user selection of the SEED portal 180. When the SEED portal 180 is selected by the user, as described above by reference to FIG. 1, several sections of the SEED portal can be accessed, including a company organization section 1305, a roles and permissions section 1310, a user's section 1315, a hierarchy section 1320, an instructors section 1325, a student's section 1330, an interactive dashboard 1335, a reports section 1340, a student/trainee dashboard 1345, an auto test generator tool 1350, a library 1355, a learning management system 1360, and a section for driver qualification files 1365.

Turning to a detailed description of the portal implementation, FIG. 14 conceptually illustrates a detailed breakdown of a SEED portal implementation of the incident evaluation, training, and correction system 1300 to spot at-risk behavior, explain both the at-risk behavior and correct behavior, enforce the correct behavior, and document the incident that gave rise to the at-risk behavior. As shown in this figure, when the SEED portal 180 is selected by the user, the company organization section 1305 can be expanded to show multiple categories, such as CATEGORY 1—Example District (at 1405), CATEGORY 2 (at 1410), CATEGORY 3 (at 1415), CATEGORY 4 (at 1420), and CATEGORY 5 (at 1425). While CATEGORY 1-5 are non-descriptive examples of possible company organization categories, it is noted that the categories can be configured by an authorized user, such that categories are added, deleted, modified, etc., as needed according to the company organization.

Similarly, the roles and permissions section 1310, referenced in FIG. 2 and further described here, expands to super admins (at 1430) in which a certified safe driver ("CSD") assigns permission levels. Specifically, a level five designation (at 1435) confers master admin (at 1440) privileges to the user. A level four designation (at 1445) is different from the level five designation (at 1435), and therefore, has different types of user permissions. The level four permissions are described by reference to FIG. 15, which conceptually illustrates a continuation of the detailed breakdown of the SEED portal implementation of the incident evaluation, training, and correction system of FIG. 14. Specifically, the level four permissions include complete usage rights and minimal admin rights (at 1450). At a level three designation (at 1455), the assigned user would have app usage rights and report viewing and updating rights (at 1460). When a level two designation (at 1465) is made, the user is granted only app usage rights (at 1470). Finally, a level one designation (at 1475) only provides the user with report viewing rights (at 1480).

Next, the users section 1315, referenced in FIG. 2 and further described here, expands to an option to create/assign hierarchy details (at 1510). The hierarchy section 1320, referenced in FIG. 2 and further described here, follows the users section 1315 and expands to several options to create hierarchy details (at 1520), create notification titles (at 1530), and assign notification users (at 1540).

Now turning to FIG. 16, which conceptually illustrates a continuation of the detailed breakdown of the SEED portal implementation of the incident evaluation, training, and correction system of FIG. 15, the instructors section 1325, referenced in FIG. 2 and further described here, expands to an option to list instructors per company (at 1610) and an option to list instructors per company organization or school (at 1620). Another item under the instructors section 1325 is to create an instructor with all pertinent information (at 1630).

The next section in this figure is the students section 1330, which is referenced in FIG. 2 and further described here. Specifically, the students section 1330 expands to an option to list students per company or school (at 1640) and an option to list students per company organization or school (at 1650). Another item under the students section 1330 is to create a student with all pertinent information (at 1660).

Another aspect of the portal breakdown 1300 shown in FIG. 16 is the interactive dashboard 1335, which expands to several items, some of which are described by reference to FIG. 16 and others that are described by reference to FIG. 17. As shown in FIG. 16, the interactive dashboard 1335 includes an item for analytics (at 1670) in which a user can select to see an analysis of incident probability by company organization levels (at 1680). Turning now to FIG. 17, which conceptually illustrates a continuation of the detailed breakdown of the SEED portal implementation of the incident evaluation, training, and correction system of FIG. 16, the interactive dashboard 1335 under analytics (at 1670) further includes an option for the user to review an analysis of hazard data (at 1690) and another option to review trainer analysis (at 1695).

Moving forward, the reports section 1340, referenced in FIG. 2 and further described here, expands to a selectable report option for log & pre-trip (at 1705) which is detailed by section and includes item-by-item report details/scoring (at 1710). The reports section 1340 also includes options to select a department of transportation ("DOT") incident report (at 1715), an insurance carrier incident report (at 1720), company incident reports (at 1725), overdue report(s) (at 1730), a list of reports coming due in specific (e.g., 30, 15, 5, etc., days out) time period (at 1735), an option to show percentage of effective reports (at 1740), an option to show reports in which the most help is needed (at 1745), and an option to show best in class reports (at 1750).

Another item is the student/trainee dashboard 1345, referenced in FIG. 2 and further described here in FIG. 17 and by reference to FIG. 18. As shown, the student/trainee dashboard 1345 expands provide a filtering option by company or by company organization (at 1755) and an option to show training history and applicable documentation (at 1760). In FIG. 18, which conceptually illustrates a continuation of the detailed breakdown of the SEED portal implementation of the incident evaluation, training, and correction system of FIG. 17, the student/trainee dashboard 1345 further expands to an option to show incident history and applicable documentation (at 1765) and an auto purging option (at 1770).

Next in FIG. 18 is the auto test generator tool 1350, which is referenced in FIG. 2 and further described here. The auto test generator tool 1350 includes an option to automatically send a test to a student or employee via phone or email (at 1810). The auto test generator tool 1350 also generates tests that are specific to the elements which are in most need of help by the student or employee (at 1820). Furthermore, the auto test generator tool 1350 can create shown element reviews that include quizzes for the student or employee (at 1830). The auto test generator tool 1350 includes a configuration option to generate and send out monthly tests, element reviews, and quizzes (at 1840) which are generated each month based on continuously updated information about the elements in which the student or employee needs the most help and other such information. The auto test generator tool 1350 provides hierarchy notifications (at 1850) to inform relevant parties and personnel on the improvements or status of the student or employee. The auto test generator tool 1350 also generates reports of completed tests, reviews, quizzes, etc., with upcoming due dates and overdue tests, reviews, and quizzes (at 1860). In some embodiments, the auto test generator tool 1350 is configured to include the completed, due, and overdue tests, reviews, and quizzes of each employee or student in the notifications sent to the relevant parties or personnel in the hierarchy.

The library 1355, which referenced in FIG. 2 and further described here, expands to safe driver/safe work practices presentations (at 1870), short meeting templates (at 1880), and daily communications (at 1890).

Another item is the learning management system 1360, which is referenced in FIG. 2 and is further described in this figure and by reference to FIG. 19, which conceptually illustrates a continuation of the detailed breakdown of the SEED portal implementation of the incident evaluation, training, and correction system of FIG. 18. The learning management system 1360 expands (as shown in FIG. 19) to options for safe driving records (at 1905), safe work practices (at 1910), power industrial truck learning/education (at 1915), and OSHA compliance (at 1920) records.

Similarly, the driver qualification files 1365, referenced in FIG. 2 and further described here and by reference to FIGS. 20 and 21, expands to a selectable option for a driver-specific application (at 1930) which, for each driver, includes information about the driver for the duration of employment plus three additional years after cessation (at 1940). The driver qualification files 1365 also expands to a selectable option for an original motor vehicle record from the time of hire for the current job (at 1950) which is on file for the duration of employment plus three extra years after employment ceases (at 1960). The driver qualification files 1365 also expands to a selectable option for a road test certificate (at 1970) which remains on file for the duration of employment plus three extra years after employment ceases (at 1980). The driver qualification files 1365 also expands to a selectable option for a photo copy of the driver's license of the driver if used in lieu of a road test (at 1980).

Turning to FIG. 20, conceptually illustrates a continuation of the detailed breakdown of the SEED portal implementation of the incident evaluation, training, and correction system of FIG. 19, the photo copy of the driver's license of the driver, when selected from the driver qualification files 1365, remains on file for the duration of employment plus three extra years after employment ceases (at 2010). However, subsequent driver's license renewals do not trigger a need for a new photo copy of the license after renewal—the driver qualification files 1365 only maintain the photo copy of the driver's license from the moment of employment. Next, the driver qualification files 1365 also expands to a selectable option for returned safety performance history inquiry or records of good faith efforts (at 2020), which is only for the duration of employment plus three extra years and stored in accordance with confidentiality requirements specified in the Code of Federal Regulations, under 49 CFR § 391.53 (at 2030). Next, the driver qualification files 1365 also expands to a selectable option for annual motor vehicles records ("MVR") of the employed driver (at 2040), which is stored in the driver qualification files 1365 for three years from the document date (at 2050). Additionally, the driver qualification files 1365 expands to another selectable option for annual documented review of the annual MVR of the driver (at 2060), which is stored in the driver qualification files 1365 for three years from the document date (at 2070). The driver qualification files 1365 further expands to another selectable option for driver's annual list of violations (at 2080) which is also known as a certificate of violations.

Now referring to FIG. 21, which conceptually illustrates a continuation of the detailed breakdown of the SEED portal implementation of the incident evaluation, training, and correction system of FIG. 20, the certificate of violations 2080 for the driver is stored in the driver qualification files 1365 for only three years from the document date (at 2110). Next, the driver qualification files 1365 expands to a further selectable option for medical examination certificate (at 2120), which is stored in the driver qualification files 1365 for three years from the document date (at 2130). The driver qualification files 1365 again expands to a further selectable option for medical or CDL holder vehicle report indicating medical status (at 2140), which is stored in the driver qualification files 1365 for three years from the document date (at 2150). Next, the driver qualification files 1365 expands to another selectable option for documentation that the national registry of certified medical examination for driver physicals has been checked (at 2160), which is stored in the driver qualification files 1365 for three years from the document date (at 2170). Finally, the driver qualification files 1365 expands to yet another selectable option for medical variance or exemption document (at 2180), if applicable, which is stored in the driver qualification files 1365 for three years from the document date (at 2190).

While the numeric scoring system shown in FIG. 22 is described above, reference is now made to FIG. 23 and FIG. 24. Specifically, FIG. 23 demonstrates an example of a SEED algorithm implementation used by an incident evaluation, training, and correction system and process or incorporated into another system. Also, FIG. 24 conceptually illustrates additional features of the incident evaluation, training, and correction system and process, and such features that may be added to aspects of the SEED app or SEED portal described above by reference to FIGS. 2-21.

Cloud System (FIG. 25)

By way of example, FIG. 25 conceptually illustrates a cloud computing software-as-a-service ("SaaS") cloud-computing network architecture over which an incident evaluation, training, and correction system is deployed (hereinafter referred to as the "SaaS cloud-based incident evaluation, training, and correction system 2500"). As shown in this figure, the SaaS cloud-based incident evaluation, training, and correction system 2500 includes a first vehicle associated with a first driver 2505, a second vehicle associated with a second driver 2510, a global positioning system (GPS) satellite 2515, a communication tower 2520, a gateway 2525, an access device 2530, a certified safe driver ("CSD") service 2535, backend servers and databases 2540, and a computer 2545 for portal access. The first vehicle associated with a first driver 2505 includes a GPS device that allows for turn-by-turn tracking and mapping of the route over which the first vehicle associated with a first driver 2505 travels in connection with deliveries, driver instruction or testing, etc. The second vehicle associated with a second driver 2510 is a delivery van operated by a driver with a driver's license in the appropriate class. The second vehicle associated with a second driver 2510 also includes a GPS device. The GPS devices in the first vehicle associated with a first driver 2505 and the second vehicle associated with a second driver 2510 may be embedded GPS chips in the smartphones of the first driver and the second driver. When the devices of the first driver and the second driver are running, the mobile app is able to query the onboard embedded GPS chip for location information and calculate or determine a present location. When route mapping is configured, the location information is used to calculate or determine present location continuously as long as the respective vehicle is being driven.

To make the cloud-based training tool for coaching and reinforcement of defensive driver skills and knowledge of the present disclosure, a person would need to implement and deploy the SaaS cloud-based incident evaluation, training, and correction system 2500. The person would likely need (or would need to obtain) knowledge and experience on how a company should conduct training in order to generate a mobile SEED app, SEED portal, and other such implementations to use by clients connecting to the CSD service 2535 hosted by the SaaS cloud-based incident evaluation, training, and correction system 2500. The SEED app presents questions to a user in which each question prompts an answer from the driver in a scoring case, from 1-5, with five (5) being best—along the lines of the numeric scoring system 520 described above, by reference to FIGS. 5 and 6, and shown in isolation in FIG. 22. If the user receives less than a score of five (5), instructions are given to validate that training took place. In this way, the training is validated and documented, thereby providing a valuable enhancement to the overall system. Also, each particular item is coded in CSD service 2535 and the SEED app (and other implementations) and by a developer into line items and written codes to make this as unique as possible. There are thousands of algorithms the drive the logical framework of the SaaS cloud-based incident evaluation, training, and correction system 2500 and the CSD service 2535, putting the entire SaaS cloud-based incident evaluation, training, and correction system 2500 into a state of intelligent analysis to help ensure results that would benefit a particular driver, such as by helping them to make the right choice among multiple possible life altering choices. In a preferred embodiment, the cloud-based training tool is accessible to drivers who use the SEED app (or software) to connect to the CSD service 2535 hosted by the SaaS cloud-based incident evaluation, training, and correction system 2500. In this way, users are able to obtain coaching and reinforcement of defensive driver skills and knowledge which trains people in commercial vehicle environments to be risk averse (and to not be risk tolerant). In this way, the cloud-based training tool helps those people to become more defensive drivers, protecting them as well as the general public so that people can go home to their families safely each day. Also, as regulations change, the cloud-based training tool of the SaaS cloud-based incident evaluation, training, and correction system 2500 is routinely updated to reflect the changes in regulations in a way to that further assists users to be more risk averse, in view of the updated/new/changed regulations.

To use the cloud-based training tool for coaching and reinforcement of defensive driver skills and knowledge of the present disclosure, someone would train and educate a cadre of trainers on how to use the cloud-based training tool for coaching and reinforcement of defensive driver skills and knowledge to make them more proficient than they ever have been. They can simply connect to the CSD service 2535 which runs on the backend servers 2540 and is hosted by the SaaS cloud-based incident evaluation, training, and correction system 2500. Alternatively, some companies, organizations, or driving schools may deploy in-house locally-installed incident evaluation, training, and correction systems on their private in-house networks.

As such, the SaaS cloud-based incident evaluation, training, and correction system 2500, the SEED app implementation, the SEED portal implementation, and other software system implementations ensure that the cloud-based training tool for coaching and reinforcement of defensive driver skills and knowledge is at the disposal of users to create comprehensive pre-trip evaluation and coaching and post-trip data analysis, behind the wheel evaluation and coaching, and hazard data analysis that will provide the client with reports that they can utilize, to better manage their processes, create training process, focus on reducing at risk behaviors, quizzes to help the driver to focus on constant and consistent training, where each trainer, manager and divisional manager can excel at his or her job.

The above-described embodiments of the invention are presented for purposes of illustration and not of limitation. Also, many of the above-described features and applications are implemented as software processes that are specified as a set of instructions recorded on a computer readable storage medium (also referred to as computer readable medium or machine readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

FIG. 26 conceptually illustrates an electronic system 2600 with which some embodiments of the invention are implemented. The electronic system 2600 may be a computer, phone (cell phone, mobile phone, smartphone, etc.), PDA (iPod, other handheld computing device, etc.), or any other sort of electronic device or computing device. Such an electronic system includes various types of computer readable media and interfaces for various other types of computer readable media. Electronic system 2600 includes a bus 2605, processing unit(s) 2610, a system memory 2615, a read-only memory 2620, a permanent storage device 2625, input devices 2630, output devices 2635, and a network 2640.

The bus 2605 collectively represents all system, peripheral, and chipset buses that communicatively connect the numerous internal devices of the electronic system 2600. For instance, the bus 2605 communicatively connects the processing unit(s) 2610 with the read-only memory 2620, the system memory 2615, and the permanent storage device 2625.

From these various memory units, the processing unit(s) 2610 retrieves instructions to execute and data to process in order to execute the processes of the invention. The processing unit(s) may be a single processor or a multi-core processor in different embodiments.

The read-only-memory (ROM) 2620 stores static data and instructions that are needed by the processing unit(s) 2610 and other modules of the electronic system. The permanent storage device 2625, on the other hand, is a read-and-write memory device. This device is a non-volatile memory unit that stores instructions and data even when the electronic system 2600 is off. Some embodiments of the invention use a mass-storage device (such as a magnetic or optical disk and its corresponding disk drive) as the permanent storage device 2625.

Other embodiments use a removable storage device (such as a flash drive) as the permanent storage device 2625. Like the permanent storage device 2625, the system memory 2615 is a read-and-write memory device. However, unlike storage device 2625, the system memory 2615 is a volatile read-and-write memory, such as a random access memory. The system memory 2615 stores some of the instructions and data that the processor needs at runtime. In some embodiments, the invention's processes are stored in the system memory 2615, the permanent storage device 2625, and/or the read-only memory 2620. For example, the various memory units include instructions for processing appearance alterations of displayable characters in accordance with some embodiments. From these various memory units, the processing unit(s) 2610 retrieves instructions to execute and data to process in order to execute the processes of some embodiments.

The bus 2605 also connects to the input and output devices 2630 and 2635. The input devices enable the user to communicate information and select commands to the electronic system. The input devices 2630 include alphanumeric keyboards and pointing devices (also called "cursor control devices"). The output devices 2635 display images generated by the electronic system 2600. The output devices 2635 include printers and display devices, such as cathode ray tubes (CRT) or liquid crystal displays (LCD). Some embodiments include devices such as a touchscreen that functions as both input and output devices.

Finally, as shown in FIG. 26, bus 2605 also couples electronic system 2600 to a network 2640 through a network adapter (not shown). In this manner, the computer can be a part of a network of computers (such as a local area network ("LAN"), a wide area network ("WAN"), or an intranet), or a network of networks (such as the Internet). Any or all components of electronic system 2600 may be used in conjunction with the invention.

These functions described above can be implemented in digital electronic circuitry, in computer software, firmware or hardware. The techniques can be implemented using one or more computer program products. Programmable processors and computers can be packaged or included in mobile devices. The processes may be performed by one or more programmable processors and by one or more set of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the invention has been described with reference to numerous specific details, one of ordinary skill in the art will recognize that the invention can be embodied in other specific forms without departing from the spirit of the invention. For instance, FIGS. 3-12 and 14-21 conceptually illustrate processes in which the specific operations of the process may not be performed in the exact order shown and described. Specific operations may not be performed in one continuous series of operations, and different specific operations may be performed in different embodiments. Furthermore, each process could be implemented using several sub-processes, or as part of a larger macro process. Thus, one of ordinary skill in the art would understand that the invention is not to be limited by the foregoing illustrative details, but rather is to be defined by the appended claims.

We claim:

1. A cloud-based training tool for coaching and reinforcement of defensive driver skills and knowledge comprising:

a pre-trip evaluation and coaching module that includes at least twenty-one pre-trip evaluation and coaching selections which cover at least one-hundred twenty pre-trip evaluation and coaching sub-selections with instructions, wherein the pre-trip evaluation and coaching module is configured to access a certified safe driver ("CSD") service hosted by a software-as-a-service ("SaaS") cloud-based incident evaluation, training, and correction system by way of a mobile application ("mobile app") that runs on a mobile device operated by a driver, wherein the mobile device comprises a global positioning system ("GPS") receiver that is configured to calculate a geo-spatial location of the mobile device based on location data received from a plurality of GPS satellites;

a behind the wheel evaluation and coaching module that is configured to perform an on-road evaluation that occurs while the driver is driving a vehicle, wherein the on-road evaluation includes at least twenty-one on-road evaluation selections which cover at least one-hundred forty one sub-selections and instructions, wherein the geo-spatial location of the mobile device is used to continuously map a route that is plotted and numbered on a turn-by-turn basis in realtime while the driver is driving the vehicle for the on-road evaluation, wherein the mobile device transmits the plotted and numbered turns of the mapped route to the CSD service to add remarks corresponding to each plotted and numbered turn; and an eye movement module of the mobile app configured to perform eye movement tracing with respect to the driver and perform an eye triangle movement test which is configured to track eye movements of the driver in realtime while the driver is driving the vehicle during the on-road evaluation, wherein results of the eye triangle movement test are transmitted to the CSD service.

2. The cloud-based training tool for coaching and reinforcement of defensive driver skills and knowledge of claim 1, wherein the remarks corresponding to each plotted and numbered turn of the mapped route comprises one of an OK remark, a WIDE remark, and a SHORT remark.

3. The cloud-based training tool for coaching and reinforcement of defensive driver skills and knowledge of claim 2, wherein each remark corresponding to a plotted and numbered turn of the mapped route is based on a turn path of the vehicle for the plotted and numbered turn compared to a corresponding known turn of a known map route.

4. The cloud-based training tool for coaching and reinforcement of defensive driver skills and knowledge of claim 3, wherein the turn path is calculated by the mobile app based on a plurality of location data points received by the GPS receiver of the mobile device as the driver engages the vehicle for the turn.

5. The cloud-based training tool for coaching and reinforcement of defensive driver skills and knowledge of claim 4, wherein the mobile app is configured to compare the calculated turn path to a corresponding model turn based on the route and other factors.

6. The cloud-based training tool for coaching and reinforcement of defensive driver skills and knowledge of claim 1 further comprising a vehicle road test module that runs in connection with the mobile app to enable an instructor to spot, explain, educate, and document other aspects of driver behavior beyond pre-trip behavior and behind the wheel behavior while a training driver is driving a particular vehicle.

7. The cloud-based training tool for coaching and reinforcement of defensive driver skills and knowledge of claim 6, wherein the vehicle road test module is configured to use a numeric scoring system.

8. The cloud-based training tool for coaching and reinforcement of defensive driver skills and knowledge of claim 7, wherein the numeric scoring system is tailored to requirements of a State Department of Motor Vehicles ("DMV").

* * * * *